United States Patent
Ma et al.

(10) Patent No.: US 12,335,988 B2
(45) Date of Patent: Jun. 17, 2025

(54) SLOT FORMAT FOR INTRA-FREQUENCY CROSS LINK INTERFERENCE MEASUREMENT

(71) Applicant: QUALCOMM INCORPORATED, San Diego, CA (US)

(72) Inventors: Ruifeng Ma, Beijing (CN); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 350 days.

(21) Appl. No.: 17/800,303

(22) PCT Filed: Apr. 8, 2020

(86) PCT No.: PCT/CN2020/083706
§ 371 (c)(1),
(2) Date: Aug. 17, 2022

(87) PCT Pub. No.: WO2021/203282
PCT Pub. Date: Oct. 14, 2021

(65) Prior Publication Data
US 2023/0070642 A1    Mar. 9, 2023

(51) Int. Cl.
*H04W 72/541* (2023.01)
*H04L 5/00* (2006.01)
(Continued)

(52) U.S. Cl.
CPC ......... *H04W 72/541* (2023.01); *H04W 24/10* (2013.01); *H04W 72/0446* (2013.01); *H04W 72/23* (2023.01)

(58) Field of Classification Search
CPC ............... H04W 72/541; H04W 24/10; H04W 72/0446; H04W 72/23; H04W 24/02;
(Continued)

(56) References Cited

U.S. PATENT DOCUMENTS 11,070,302 B2 * 7/2021 Kang .................... H04B 17/345
11,394,587 B2 * 7/2022 Kang .................... H04L 5/0073
(Continued)

FOREIGN PATENT DOCUMENTS

CN    110049510 A    7/2019
CN    110392990 A   10/2019
(Continued)

OTHER PUBLICATIONS

ZTE: "Discussion on Remaining Issues of Network Coordination Mechanisms", 3GPP TSG RAN WG1 #96, R1-1901970, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019, 7 Pages, XP051599663.
(Continued)

*Primary Examiner* — Harry H Kim
(74) *Attorney, Agent, or Firm* — Holland & Hart LLP

(57) ABSTRACT

Methods, systems, and devices for wireless communications are described. A user equipment (UE) may receive control signaling indicating a resource for measuring cross link interference (CLI). The UE may determine that the resource overlaps with (e.g., at least partially overlaps) one or more symbols or a transmission occasion. The UE may determine, according to what the resource overlaps with, whether to measure CLI over the resource. For example, if one or more of the symbols is uplink or if the resource verlaps a transmission occasion, the UE may not measure CLI. If one or more of the symbols are downlink, the UE may measure CLI. If one or more of the symbols is flexible or has an unknown type, the UE may determine whether to measure CLI based on a type of the control signaling.

16 Claims, 17 Drawing Sheets

(51) Int. Cl.
*H04W 24/02* (2009.01)
*H04W 24/10* (2009.01)
*H04W 72/0446* (2023.01)
*H04W 72/23* (2023.01)

(58) Field of Classification Search
CPC ..... H04L 5/0062; H04L 5/0053; H04L 5/006; H04L 5/0094
See application file for complete search history.

(56) References Cited

U.S. PATENT DOCUMENTS

| | | | | |
|---|---|---|---|---|
| 11,575,425 | B2* | 2/2023 | Akoum | H04L 25/021 |
| 11,770,847 | B2* | 9/2023 | Barbu | H04L 5/1469 370/252 |
| 12,082,228 | B2* | 9/2024 | Ying | H04B 17/318 |
| 12,132,528 | B2* | 10/2024 | Ying | H04B 7/063 |
| 2018/0323887 | A1* | 11/2018 | Azarian Yazdi | H04W 24/08 |
| 2022/0116129 | A1* | 4/2022 | Ying | H04B 7/0617 |

FOREIGN PATENT DOCUMENTS

| | | |
|---|---|---|
| CN | 110637494 A | 12/2019 |
| CN | 110972156 A | 4/2020 |
| WO | WO-2018202144 A1 | 11/2018 |
| WO | WO-2018223386 A1 | 12/2018 |
| WO | WO-2020143736 A1 | 7/2020 |

OTHER PUBLICATIONS

Supplementary European Search Report—EP20930132—Search Authority—The Hague—Dec. 11, 2023.

ZTE: "Discussion on Remaining Issues of Network Coordination Mechanisms", 3GPP TSG RAN WG1 #96, R1-1901970, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019, 7 Pages, XP051599663, Section 2.1-Section 2.2, p. 4, Section 2.3.

International Search Report and Written Opinion—PCT/CN2020/083706—ISA/EPO—Dec. 29, 2020.

LG Electronics: Summary of Issues on UE-UE CLI Measurements and Network Coordination Mechanism, 3GPP TSG RAN WG1 Meeting #96, R1-1903452, Athens, Greece, Feb. 12-16, 2019, Feb. 16, 2019 (Feb. 16, 2019) the Whole Document, 28 Pages.

Qualcomm Incorporated: "Enhancements to Support NR Backhaul Links", 3GPP TSG RAN WG1 Meeting #94b, R1-1811256, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Oct. 12, 2018 (Oct. 12, 2018), 22 Pages, XP051518659, Retrieved from the Internet: URL: http://www.3gpp.org/ftp/tsg%5Fran/WG1%5FRL1/TSGR1%5F94b/Docs/R1%2D1811256%2Ezip [retrieved on Sep. 29, 2018] the whole document, figures 1-9, tables 1-6, sections 1-3, section 2.6.

* cited by examiner

SLOT FORMAT FOR INTRA-FREQUENCY CROSS LINK INTERFERENCE MEASUREMENT

CROSS REFERENCE

The present Application is a 371 national stage filing of International PCT Application No. PCT/CN2020/083706 by MA et al. entitled "SLOT FORMAT FOR INTRA-FREQUENCY CROSS LINK INTERFERENCE MEASUREMENT," filed Apr. 8, 2020, which is assigned to the assignee hereof, and which is expressly incorporated by reference in its entirety herein.

FIELD OF TECHNOLOGY

The following relates generally to wireless communications and more specifically to slot format for intra-frequency cross link interference measurement.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support slot formats for intra-frequency cross link interference (CLI) measurement. Generally, the described techniques provide for a user equipment (UE) to determine whether to measure CLI according to one or more types of symbols (e.g., downlink, uplink, or flexible) that a resource for measuring the CLI overlaps (e.g., at least partially overlaps) with or according to the type of control signaling that configures the resource (e.g., semi-static control signaling or dynamic control signaling), or both. For example, a UE may receive control signaling indicating a resource for measuring CLI. The UE may determine that the resource overlaps with a set of symbols or a transmission occasion. The UE may determine, according to the resource overlapping with the set of symbols or the transmission occasion, whether to measure CLI over the resource. For example, if one of the set of symbols is an uplink symbol or if the resource overlaps with a transmission occasion, the UE may not measure CLI. If one of the set of symbols, or each of the set of symbols, are downlink symbols, the UE may measure CLI. If any of the symbols of the set of symbols is flexible or has an unknown type, the UE may determine whether to measure CLI based on, for example, a type of the control signaling. For example, if the control signaling is semi-static, the UE may not measure CLI, while if the control signaling is dynamic, the UE may measure CLI.

A method for wireless communication is described. The method may include determining a slot format for one or more slots, receiving control signaling indicating a resource for measuring cross link interference, determining that the indicated resource overlaps with a symbol of a slot of the one or more slots, where the symbol includes a downlink symbol or a flexible symbol, and measuring the cross link interference over the resource based on the symbol of the slot of the one or more slots overlapping with the resource.

An apparatus for wireless communication is described. The apparatus may include a processor, memory in electronic communication with the processor, and instructions stored in the memory. The instructions may be executable by the processor to cause the apparatus to determine a slot format for one or more slots, receive control signaling indicating a resource for measuring cross link interference, determine that the indicated resource overlaps with a symbol of a slot of the one or more slots, where the symbol includes a downlink symbol or a flexible symbol, and measure the cross link interference over the resource based on the symbol of the slot of the one or more slots overlapping with the resource.

Another apparatus for wireless communication is described. The apparatus may include means for determining a slot format for one or more slots, means for receiving control signaling indicating a resource for measuring cross link interference, means for determining that the indicated resource overlaps with a symbol of a slot of the one or more slots, where the symbol includes a downlink symbol or a flexible symbol, and means for measuring the cross link interference over the resource based on the symbol of the slot of the one or more slots overlapping with the resource.

A non-transitory computer-readable medium storing code for wireless communication is described. The code may include instructions executable by a processor to determine a slot format for one or more slots, receive control signaling indicating a resource for measuring cross link interference, determine that the indicated resource overlaps with a symbol of a slot of the one or more slots, where the symbol includes a downlink symbol or a flexible symbol, and measure the cross link interference over the resource based on the symbol of the slot of the one or more slots overlapping with the resource.

Some examples of the method, apparatuses, and non-transitory computer-readable medium described herein may further include operations, features, means, or instructions for receiving dynamic control signaling indicating that the symbol includes the downlink symbol, where measuring the cross link interference over the resource may be based on the dynamic control signaling indicating that the symbol includes the downlink symbol.

Some examples of the method, apparatuses, and non-transitory computer-readable medium described herein may further include operations, features, means, or instructions for receiving semi-static control signaling indicating that the symbol includes the flexible symbol, and determining that the symbol includes the downlink symbol based on the dynamic control signaling overriding the semi-static control signaling.

In some examples of the method, apparatuses, and non-transitory computer-readable medium described herein, the semi-static control signaling includes radio resource control signaling indicating that the symbol includes the flexible symbol.

In some examples of the method, apparatuses, and non-transitory computer-readable medium described herein, the dynamic control signaling includes downlink control information indicating that the symbol includes the downlink symbol.

Some examples of the method, apparatuses, and non-transitory computer-readable medium described herein may further include operations, features, means, or instructions for receiving dynamic control signaling indicating that the symbol includes the flexible symbol, where measuring the cross link interference over the resource may be based on the dynamic control signaling indicating that the symbol includes the flexible symbol.

Some examples of the method, apparatuses, and non-transitory computer-readable medium described herein may further include operations, features, means, or instructions for receiving semi-static control signaling indicating that the symbol includes the flexible symbol, where measuring the cross link interference over the resource may be based on the semi-static control signaling indicating that the symbol includes the flexible symbol.

In some examples of the method, apparatuses, and non-transitory computer-readable medium described herein, the semi-static control signaling includes radio resource control signaling indicating that the symbol includes the flexible symbol.

In some examples of the method, apparatuses, and non-transitory computer-readable medium described herein, the dynamic control signaling includes downlink control information indicating that the symbol includes the flexible symbol.

In some examples of the method, apparatuses, and non-transitory computer-readable medium described herein, the control signaling indicating the resource includes second dynamic control signaling indicating the resource, and where measuring the cross link interference over the resource that overlaps with the flexible symbol may be based on the control signaling including the second dynamic control signaling.

Some examples of the method, apparatuses, and non-transitory computer-readable medium described herein may further include operations, features, means, or instructions for receiving semi-static control signaling indicating the slot format for the one or more slots, where measuring the cross link interference over the resource may be based on the semi-static control signaling indicating the slot format for the one or more slots.

In some examples of the method, apparatuses, and non-transitory computer-readable medium described herein, the semi-static control signaling includes a common slot format and a dedicated slot format, and where measuring the cross link interference over the resource may be based on at least one of the common slot format or the dedicated slot format indicating that the symbol includes the downlink symbol.

In some examples of the method, apparatuses, and non-transitory computer-readable medium described herein, the control signaling indicating the resource includes dynamic control signaling indicating the resource, and where measuring the cross link interference over the resource may be based on the control signaling including the dynamic control signaling and based on the semi-static control signaling indicating that the symbol includes the flexible symbol.

In some examples of the method, apparatuses, and non-transitory computer-readable medium described herein, measuring the cross link interference over the resource may include operations, features, means, or instructions for measuring a received signal strength indicator, a reference signal received power of a sounding reference signal received from a user equipment, or both.

In some examples of the method, apparatuses, and non-transitory computer-readable medium described herein, receiving the sounding reference signal may include operations, features, means, or instructions for receiving the sounding reference signal within an active bandwidth part for measuring the cross link interference.

In some examples of the method, apparatuses, and non-transitory computer-readable medium described herein, the control signaling indicating the resource includes semi-static control signaling indicating the resource.

In some examples of the method, apparatuses, and non-transitory computer-readable medium described herein, the semi-static control signaling includes radio resource control signaling indicating the resource.

In some examples of the method, apparatuses, and non-transitory computer-readable medium described herein, the resource may be periodic based on the control signaling including the semi-static control signaling.

In some examples of the method, apparatuses, and non-transitory computer-readable medium described herein, the control signaling indicating the resource includes dynamic control signaling indicating the resource.

In some examples of the method, apparatuses, and non-transitory computer-readable medium described herein, the symbol includes the flexible symbol, and where measuring the cross link interference over the resource may be based on the symbol including the flexible symbol and based on the control signaling including the dynamic control signaling.

In some examples of the method, apparatuses, and non-transitory computer-readable medium described herein, the dynamic control signaling includes downlink control information indicating the resource.

In some examples of the method, apparatuses, and non-transitory computer-readable medium described herein, the resource may be aperiodic or semi-persistently scheduled based on the control signaling including the dynamic control signaling.

A method for wireless communication is described. The method may include determining a slot format for one or more slots, receiving control signaling indicating a resource for measuring cross link interference, determining that the indicated resource overlaps with a symbol of a slot of the one or more slots, where the symbol includes an uplink symbol or a flexible symbol, refraining from measuring the cross link interference over the indicated resource based on the symbol overlapping with the indicated resource including the uplink symbol or the flexible symbol, and communicating based on refraining from measuring the cross link interference.

An apparatus for wireless communication is described. The apparatus may include a processor, memory in electronic communication with the processor, and instructions stored in the memory. The instructions may be executable by the processor to cause the apparatus to determine a slot format for one or more slots, receive control signaling indicating a resource for measuring cross link interference, determine that the indicated resource overlaps with a symbol of a slot of the one or more slots, where the symbol includes an uplink symbol or a flexible symbol, refrain from measuring the cross link interference over the indicated resource based on the symbol overlapping with the indicated resource including the uplink symbol or the flexible symbol, and communicate based on refraining from measuring the cross link interference.

Another apparatus for wireless communication is described. The apparatus may include means for determining a slot format for one or more slots, means for receiving control signaling indicating a resource for measuring cross link interference, means for determining that the indicated resource overlaps with a symbol of a slot of the one or more slots, where the symbol includes an uplink symbol or a flexible symbol, means for refraining from measuring the cross link interference over the indicated resource based on the symbol overlapping with the indicated resource including the uplink symbol or the flexible symbol, and means for communicating based on refraining from measuring the cross link interference.

A non-transitory computer-readable medium storing code for wireless communication is described. The code may include instructions executable by a processor to determine a slot format for one or more slots, receive control signaling indicating a resource for measuring cross link interference, determine that the indicated resource overlaps with a symbol of a slot of the one or more slots, where the symbol includes an uplink symbol or a flexible symbol, refrain from measuring the cross link interference over the indicated resource based on the symbol overlapping with the indicated resource including the uplink symbol or the flexible symbol, and communicate based on refraining from measuring the cross link interference.

Some examples of the method, apparatuses, and non-transitory computer-readable medium described herein may further include operations, features, means, or instructions for receiving dynamic control signaling indicating that the symbol includes the uplink symbol, where refraining from measuring the cross link interference over the resource may be based on the dynamic control signaling indicating that the symbol includes the uplink symbol.

Some examples of the method, apparatuses, and non-transitory computer-readable medium described herein may further include operations, features, means, or instructions for receiving semi-static control signaling indicating that the symbol includes the flexible symbol, and determining that the symbol includes the uplink symbol based on the dynamic control signaling overriding the semi-static control signaling.

In some examples of the method, apparatuses, and non-transitory computer-readable medium described herein, the semi-static control signaling includes radio resource control signaling indicating that the symbol includes the flexible symbol.

In some examples of the method, apparatuses, and non-transitory computer-readable medium described herein, the dynamic control signaling includes downlink control information indicating that the symbol includes the uplink symbol.

Some examples of the method, apparatuses, and non-transitory computer-readable medium described herein may further include operations, features, means, or instructions for receiving dynamic control signaling indicating that the symbol includes the flexible symbol, where refraining from measuring the cross link interference over the resource may be based on the dynamic control signaling indicating that the symbol includes the flexible symbol.

Some examples of the method, apparatuses, and non-transitory computer-readable medium described herein may further include operations, features, means, or instructions for receiving semi-static control signaling indicating that the symbol includes the flexible symbol, where refraining from measuring the cross link interference over the resource may be based on the semi-static control signaling indicating that the symbol includes the flexible symbol.

In some examples of the method, apparatuses, and non-transitory computer-readable medium described herein, the semi-static control signaling includes radio resource control signaling indicating that the symbol includes the flexible symbol.

In some examples of the method, apparatuses, and non-transitory computer-readable medium described herein, the dynamic control signaling includes downlink control information indicating that the symbol includes the flexible symbol.

In some examples of the method, apparatuses, and non-transitory computer-readable medium described herein, the control signaling indicating the resource includes semi-static control signaling indicating the resource, and where refraining from measuring the cross link interference over the resource that overlaps with the flexible symbol may be based on the control signaling including the semi-static control signaling.

Some examples of the method, apparatuses, and non-transitory computer-readable medium described herein may further include operations, features, means, or instructions for receiving semi-static control signaling indicating the slot format for the one or more slots, where refraining from measuring the cross link interference over the resource may be based on the semi-static control signaling indicating the slot format for the one or more slots.

In some examples of the method, apparatuses, and non-transitory computer-readable medium described herein, the semi-static control signaling includes a common slot format and a dedicated slot format, and where refraining from measuring the cross link interference over the resource may be based on at least one of the common slot format or the dedicated slot format indicating that the symbol includes the uplink symbol.

In some examples of the method, apparatuses, and non-transitory computer-readable medium described herein, the control signaling indicating the resource includes second semi-static control signaling indicating the resource, and where refraining from measuring the cross link interference over the resource may be based on the control signaling including the second semi-static control signaling and based on the semi-static control signaling indicating that the symbol includes the flexible symbol.

Some examples of the method, apparatuses, and non-transitory computer-readable medium described herein may further include operations, features, means, or instructions for receiving dynamic control signaling indicating to transmit an uplink transmission over a second resource, where refraining from measuring the cross link interference over the resource may be based on the second resource overlapping with at least one symbol of the slot of the one or more slots.

In some examples of the method, apparatuses, and non-transitory computer-readable medium described herein, the uplink transmission includes a physical uplink shared channel transmission, a physical uplink control channel transmission, a physical random access channel transmission, a sounding reference signal, or any combination thereof.

In some examples of the method, apparatuses, and non-transitory computer-readable medium described herein, the control signaling indicating the resource includes semi-static control signaling indicating the resource.

In some examples of the method, apparatuses, and non-transitory computer-readable medium described herein, the symbol includes the flexible symbol, and where refraining from measuring the cross link interference over the resource that overlaps with the flexible symbol may be based on the symbol including the flexible symbol and based on the control signaling including the semi-static control signaling.

In some examples of the method, apparatuses, and non-transitory computer-readable medium described herein, the semi-static control signaling includes radio resource control signaling indicating the resource.

In some examples of the method, apparatuses, and non-transitory computer-readable medium described herein, the resource may be periodic based on the control signaling including the semi-static control signaling.

In some examples of the method, apparatuses, and non-transitory computer-readable medium described herein, the control signaling indicating the resource includes dynamic control signaling indicating the resource.

In some examples of the method, apparatuses, and non-transitory computer-readable medium described herein, the dynamic control signaling includes downlink control information indicating the resource.

In some examples of the method, apparatuses, and non-transitory computer-readable medium described herein, the resource may be aperiodic or semi-persistently scheduled based on the control signaling including the dynamic control signaling.

A method for wireless communication is described. The method may include receiving control signaling indicating a resource for measuring cross link interference, determining that the indicated resource overlaps with a symbol associated with an occasion for transmitting a random access channel transmission, refraining from measuring the cross link interference over the indicated resource based on the indicated resource overlapping with the symbol, and transmitting the random access channel transmission over the occasion based on refraining from measuring the cross link interference.

An apparatus for wireless communication is described. The apparatus may include a processor, memory in electronic communication with the processor, and instructions stored in the memory. The instructions may be executable by the processor to cause the apparatus to receive control signaling indicating a resource for measuring cross link interference, determine that the indicated resource overlaps with a symbol associated with an occasion for transmitting a random access channel transmission, refrain from measuring the cross link interference over the indicated resource based on the indicated resource overlapping with the symbol, and transmit the random access channel transmission over the occasion based on refraining from measuring the cross link interference.

Another apparatus for wireless communication is described. The apparatus may include means for receiving control signaling indicating a resource for measuring cross link interference, means for determining that the indicated resource overlaps with a symbol associated with an occasion for transmitting a random access channel transmission, means for refraining from measuring the cross link interference over the indicated resource based on the indicated resource overlapping with the symbol, and means for transmitting the random access channel transmission over the occasion based on refraining from measuring the cross link interference.

A non-transitory computer-readable medium storing code for wireless communication is described. The code may include instructions executable by a processor to receive control signaling indicating a resource for measuring cross link interference, determine that the indicated resource overlaps with a symbol associated with an occasion for transmitting a random access channel transmission, refrain from measuring the cross link interference over the indicated resource based on the indicated resource overlapping with the symbol, and transmit the random access channel transmission over the occasion based on refraining from measuring the cross link interference.

In some examples of the method, apparatuses, and non-transitory computer-readable medium described herein, the symbol may be within a threshold number of symbols prior to the occasion for transmitting the random access channel transmission.

In some examples of the method, apparatuses, and non-transitory computer-readable medium described herein, the control signaling includes semi-static control signaling that indicates the resource.

In some examples of the method, apparatuses, and non-transitory computer-readable medium described herein, the semi-static control signaling includes radio resource control signaling that indicates the resource.

In some examples of the method, apparatuses, and non-transitory computer-readable medium described herein, the control signaling includes dynamic control signaling that indicates the resource.

In some examples of the method, apparatuses, and non-transitory computer-readable medium described herein, the dynamic control signaling includes downlink control information that indicates the resource.

DETAILED DESCRIPTION

Figure 1:
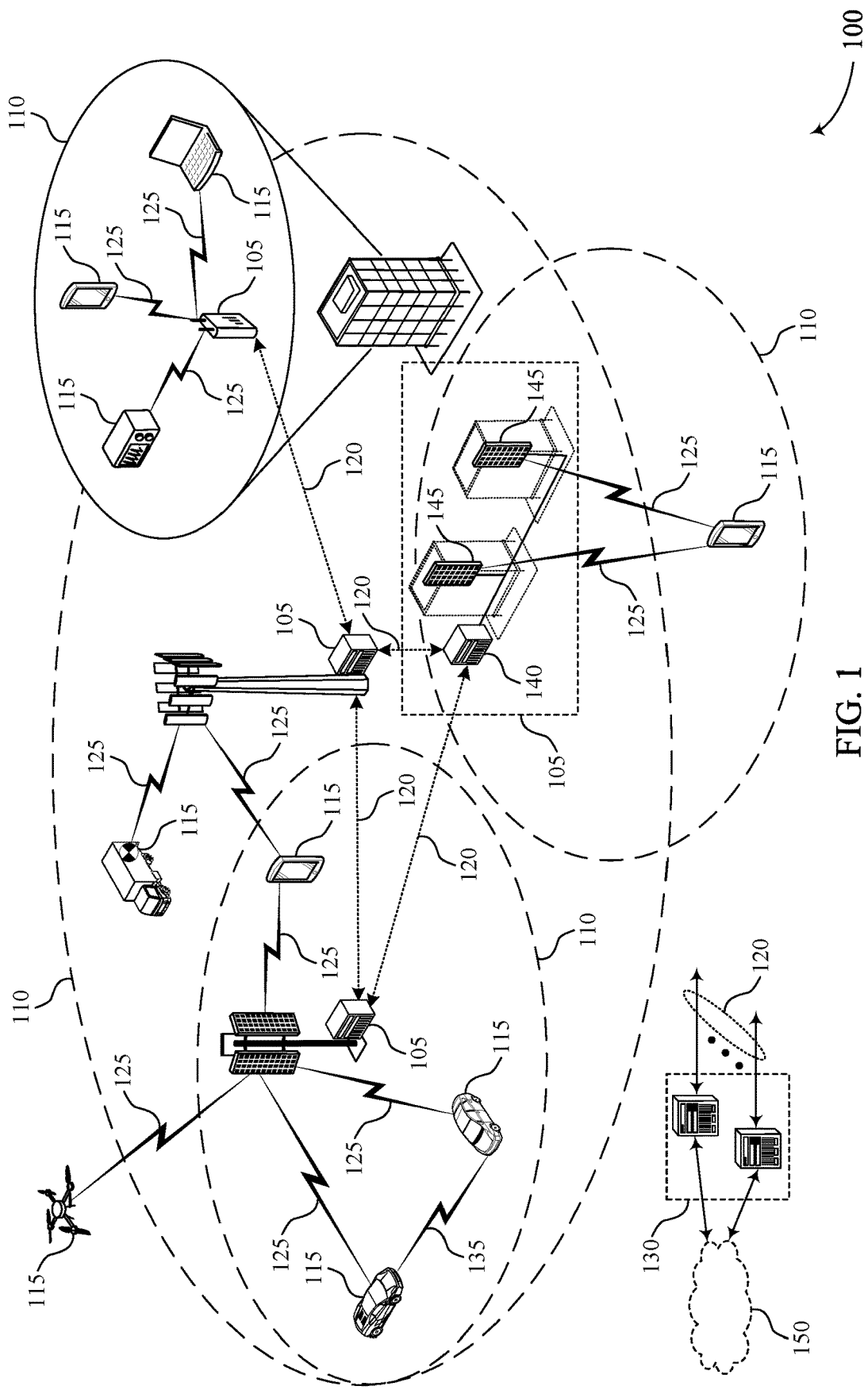
FIG. 1 illustrates an example of a wireless communications system that supports slot formats for intra-frequency cross link interference (CLI) measurement in accordance with aspects of the present disclosure.

A base station and a user equipment (UE) may perform time division duplexing (TDD), in which each symbol of each slot may be one of a downlink symbol, an uplink symbol, or a flexible symbol. Downlink symbols may be used for downlink communications from a base station, uplink symbols may be used for uplink communications to a base station, and flexible symbols may be used for either communication. The type of symbol the UE is allocated over one or more slots, which may also be referred to as a slot format, may be determined by the UE based on one or more types of signaling.

First, the base station may transmit and the UE may receive semi-static control signaling (e.g., radio resource control (RRC) signaling) that configures the UE with a common slot format and a dedicated slot format. The common slot format may be a format that may be common to one or more UEs, if not each UE, operating within a cell of the base station. The dedicated slot format may be applicable specifically to the UE to which it is sent to and may indicate to reconfigure symbols indicated by the common slot format indicated as flexible to serve as uplink symbols, or downlink symbols, or to remain flexible symbols.

Second, the base station may transmit and the UE may receive dynamic control signaling (e.g., downlink control information (DCI) signaling) that configures the UE with a dynamic slot format. The dynamic slot format may indicate to reconfigure symbols indicated by the common slot format, or the dynamic slot format, or both indicated as flexible to serve as uplink symbols, downlink symbols, or to remain flexible symbols.

In some examples, a UE operating in a first cell may interfere with a UE operating another cell due to the UE in the first cell (e.g., an aggressor UE) having an uplink or flexible symbol while the other UE operating in the other cell (e.g., a victim UE) has a downlink or flexible symbol. Such interference may be referred to as cross link interference (CLI). If the CLI takes place in an active bandwidth part (BWP) of the victim UE, the CLI may be referred to as intra-frequency CLI measurement. Some aspects of the following disclosure may relate to conditions according to which the victim UE may determine whether or not to measure CLI.

For example, a UE may receive control signaling indicating a resource for measuring CLI and may determine that the indicated resource overlaps (e.g., at least partially overlaps) with one or more symbols of a set of symbols. If the UE receives semi-static control signaling whose common slot format or dedicated slot format indicates that at least some symbols, if not each symbol, of the set of symbols is a downlink symbol, then the UE may measure the CLI over the resource. Additionally or alternatively, if the common slot format or the dedicated slot format of the semi-static control signaling indicates that at least some symbols of the set of symbols is an uplink symbol, then the UE may refrain from measuring the CLI over the resource.

If semi-static or dynamic control signaling indicates that at least some symbols of the set of symbols is flexible or if the UE fails to receive control signaling that indicates a type for the symbol (e.g., the symbol has an unknown type at the UE), the UE may measure the CLI over the resource or may refrain from doing so based on one or more conditions. For example, if the control signaling indicating the resource for measuring CLI is semi-static control signaling, the UE may refrain from measuring the CLI over the resource. However, if the control signaling indicating the resource for measuring CLI is dynamic control signaling, the UE may measure the CLI over the resource. Additionally, in cases where the resource overlaps (e.g., at least partially) with a physical random access channel (PRACH) transmission occasion, or a threshold number of symbols before the PRACH transmission occasion, or both, the UE may refrain from measuring the CLI over the resource.

Aspects of the disclosure are initially described in the context of wireless communications systems. Additional aspects of the disclosure are described in the context of an additional wireless communications system, a slot format indication scheme, CLI resource overlap scenarios, and a process flow. Aspects of the disclosure are further illustrated by and described with reference to apparatus diagrams, system diagrams, and flowcharts that relate to slot formats for intra-frequency CLI measurement.

FIG. 1 illustrates an example of a wireless communications system 100 that supports slot formats for intra-frequency CLI measurement in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a given bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a given radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a given carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Additionally or alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at given orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a given orientation (e.g., with respect to the antenna array of the transmitting device or receiving device, or with respect to some other orientation).

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

Generally, the techniques described herein may enable a UE 115 to determine whether or not to measure CLI according to types of symbols (e.g., downlink, uplink, flexible, or unknown) that a resource for measuring the CLI overlaps with, or the type of control signaling that configures the resource (e.g., semi-static control signaling or dynamic control signaling), or both. For example, A UE 115 may receive control signaling from a base station 105 indicating a resource for measuring CLI. The UE 115 may determine that the resource overlaps with a set of symbols or a PRACH transmission occasion. The UE 115 may determine, according to what the resource overlaps with, whether to measure CLI over the resource. For example, if one of the set of symbols is uplink or if the resource overlaps with a PRACH transmission occasion, the UE may not measure CLI. Alternatively, if each of the symbols are downlink, the UE 115 may measure CLI. If any of the symbols is flexible or has an unknown type, the UE 115 may determine whether to measure CLI based on a type of the control signaling. For example, if the control signaling is semi-static, the UE 115 may not measure CLI. Additionally or alternatively, if the control signaling is dynamic, the UE 115 may measure CLI.

Figure 2:
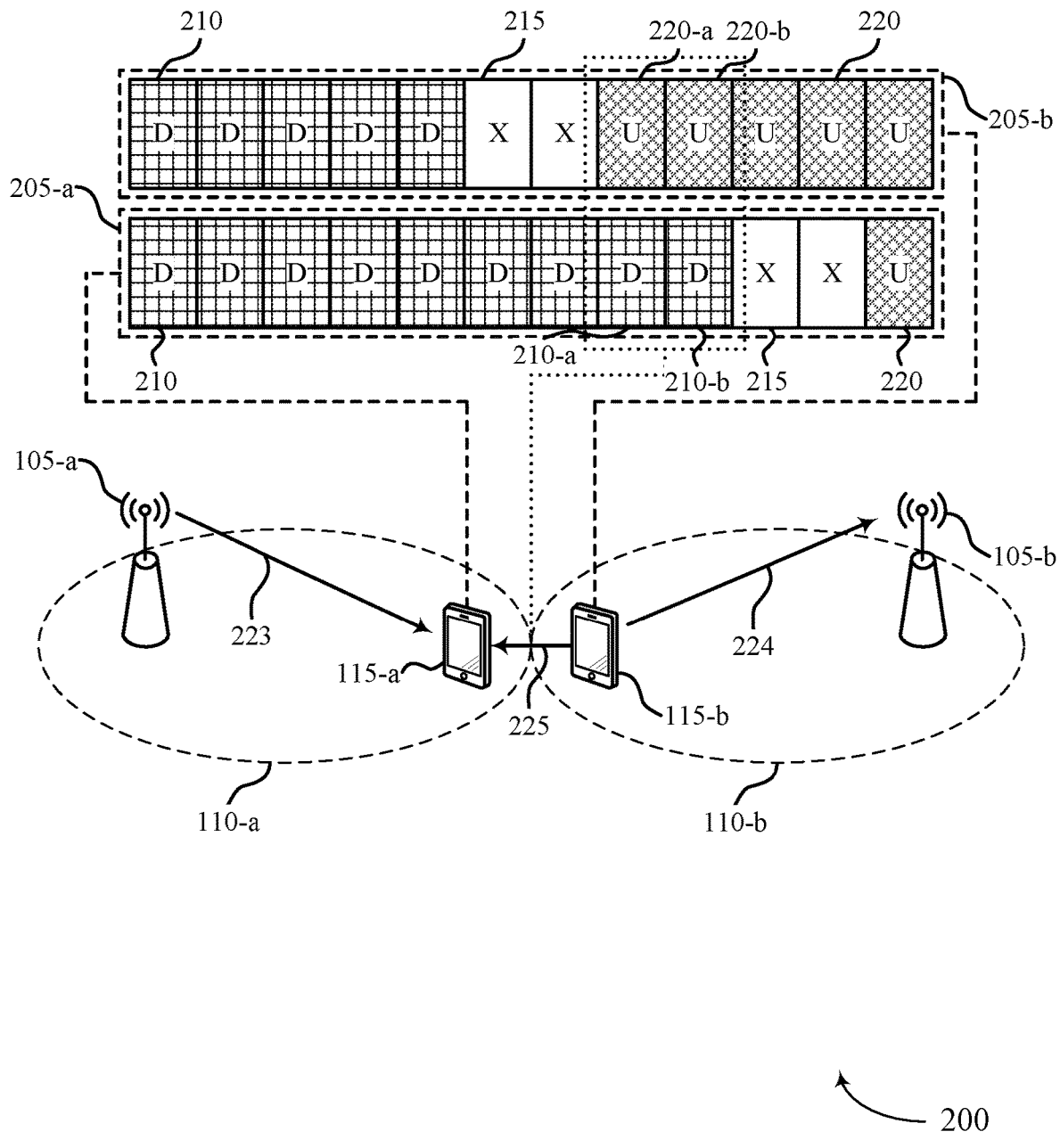
FIG. 2 illustrates an example of a wireless communications system that supports slot formats for intra-frequency CLI measurement in accordance with aspects of the present disclosure.

FIG. 2 illustrates an example of a wireless communications system 200 that supports slot formats for intra-frequency CLI measurement in accordance with aspects of the present disclosure. In some examples, wireless communications system 200 may be implemented by aspects of wireless communications system 100. For example, wireless communications system 200 may include UEs 115-a and 115-b, which may be examples of aspects of UEs 115 as described with reference to FIG. 1, and base stations 105-a and 105-b, which may be examples of aspects of base stations 105 as described with reference to FIG. 1. The UE 115-a may communicate with the base station 105-a within a coverage area 110-a of the base station 105-a and the UE 115-b may communicate with the base station 105-b within a coverage area 110-b of the base station 105-b.

The UEs 115-a and 115-b may each have a respective format, such as a TDD uplink-downlink slot format 205. For example, the UE 115-a may have an associated slot format 205-a and the UE 115-b may have an associated slot format 205-b. Each slot format 205 may configure a type for one or more symbols. For example, a slot format 205 may configure a symbol to be a downlink symbol 210, a flexible symbol 215, or an uplink symbol 220. Downlink symbols 210 may be used for downlink communications (e.g., receiving transmission 223 from a base station), uplink symbols 220 may be used for uplink communications (e.g., transmitting transmission 224 to a base station), and flexible symbols 215 may be used for either type of communication. In some examples, each slot may span one or more symbols and in some examples may have a uniform length (e.g., each slot may span a same number of symbols).

In some examples, the slot formats 205 of the UEs 115-a and 115-b may be different (e.g., one or more symbols of slot format 205-a may be configured to have a different type than one or more symbols, such as corresponding overlapping symbols, of slot format 205-b). For example, an uplink symbol 220 of slot format 205-b may overlap with a downlink symbol 210 of slot format 205-a. In some examples, uplink symbols 220-a and 220-b of slot format 205-b may overlap with downlink symbols 210-a and 210-b of slot format 205-a, respectively. In such cases, a transmission 224 transmitted by the UE 115-b in at least one of uplink symbols 220-a or 220-b may cause interference 225 with the UE 115-a while the UE 115-a is receiving a transmission 223 from base station 105-a. In such a scenario, the UE 115-a may be referred to as a victim UE 115, the UE 115-b may be referred to as an aggressor UE 115, and interference 225 may be referred to as CLI. Examples of how the network may configure slot formats 205 may be described elsewhere herein, for example, with reference to FIG. 3.

In some examples, the network (e.g., the base station 105-a) may configure measurement of the CLI at the victim UE 115 (e.g., the UE 115-a) using a metric (e.g., a measurement metric) to facilitate CLI management. Examples of the measurement metric may include CLI received signal strength indicator (RSSI) or CLI sounding reference signal (SRS) reference signal received power (RSRP), among others. In cases where the measurement metric includes CLI RSSI, the aggressor UE 115 (e.g., the UE 115-b) may transmit an SRS to the victim UE (e.g., the UE 115-a) to facilitate measurement. If the network (e.g., the base station 105-a) configures the CLI, for example, via semi-static control signaling (e.g., RRC signaling), the CLI measurement may be periodic. If the network (e.g., the base station 105-a) configures the CLI, for example, via dynamic control signaling (e.g., DCI), the CLI measurement may be semi-persistent or aperiodic.

In some examples, the CLI measurement may be an intra-frequency CLI measurement. In such cases, the victim UE 115 (e.g., the UE 115-a) may measure the CLI within a bandwidth of an active BWP of the victim UE 115 (e.g., the UE 115-a). Additionally or alternatively, configurations of the CLI RSSI resource, or CLI SRS resource, or both may be based on a serving cell frequency grid of the victim UE 115 (e.g., the UE 115-a). Additionally, the victim UE 115 (e.g., the UE 115-a) may measure the CLI based on a subcarrier spacing (SCS) of its active BWP. If the CLI SRS transmitted by the aggressor UE 115 (e.g., the UE 115-b) is configured in a different SCS, the victim UE 115 (e.g., the UE 115-a) may not measure the SRS.

The victim UE 115 (e.g., the UE 115-a) may measure intra-frequency CLI in a manner similar to how the victim UE 115 (e.g., the UE 115-a) measures downlink signals, downlink channels, or both from the serving base station 105 (e.g., base station 105-a). As such, multiplexing of a CLI resource and serving cell signals or serving cell channels (or both) may be realized based on scheduling. In such cases, the victim UE 115 may not use a dedicated measurement gap for intra-frequency CLI measurement.

The UE 115-a may perform CLI measurements in downlink symbols 210 of the UE 115-a. However, whether the UE 115-a is to perform CLI measurements when a CLI resource overlaps (e.g., at least partially overlaps) with flexible symbols 215 of the UE 115-a may depend on how a resource for performing CLI measurements were configured. For example, if the base station 105-a configures a CLI measurement resource via semi-static control signaling (e.g., RRC signaling) and the CLI measurement resource overlaps with a flexible symbol 215, the UE 115-a may refrain from measuring CLI over the configured CLI measurement resource. However, if the base station 105-a configures a CLI measurement resource via dynamic control signaling (e.g., DCI) and the CLI measurement resource overlaps with a flexible symbol 215, the UE 115-a may measure the CLI over the configured CLI measurement resource (e.g., as long as the configured CLI measurement resource does not also overlap with an uplink symbol). Additional details may be described elsewhere herein, for example, with reference to FIGS. 4A, 4B, and 4C.

Additionally, in cases where the resource overlaps with a physical random access channel (PRACH) transmission occasion, or a threshold number of symbols before the PRACH transmission occasion, or both, the UE 115-a may refrain from measuring the CLI over the resource. Additional details may be described elsewhere herein, for example, with reference to FIG. 5.

Applying one or more conditions to determine whether to measure CLI over a configured CLI measurement resource may have one or more advantages. In some examples, applying such one or more conditions may prioritize what type of transmissions a symbol is to carry. For example, according to the methods described herein, flexible symbols may not be used to carry higher-layer-configured transmissions (e.g., transmissions configured via RRC signaling), but may be used for dynamically scheduled uplink or downlink transmissions (e.g., transmissions scheduled via DCI), among other advantages.

Figure 3:
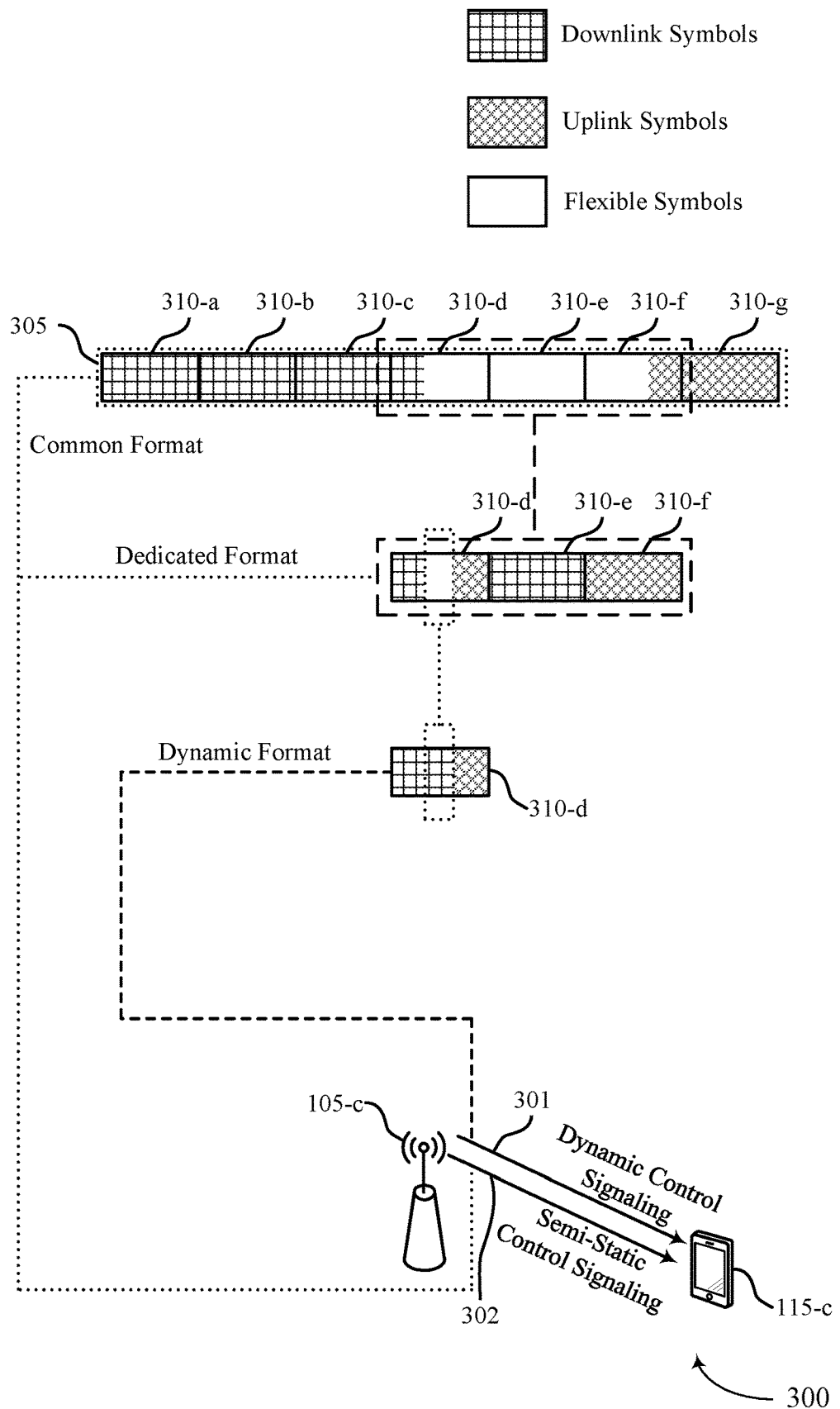
FIG. 3 illustrates an example of a slot format indication scheme that supports slot formats for intra-frequency CLI measurement in accordance with aspects of the present disclosure.

FIG. 3 illustrates an example of a slot format indication scheme 300 that supports slot formats for intra-frequency CLI measurement in accordance with aspects of the present disclosure. In some examples, slot format indication scheme 300 may be implemented by aspects of wireless communications system 100, 200, or both. For example, slot format indication scheme 300 may be implemented by a UE 115-c, which may be an example of a UE 115 as described with reference to FIG. 1 or 2, or both, and a base station 105-c, which may be an example of a base station 105 as described with reference to FIG. 1 or 2, or both.

The UE 115-c may determine a slot format (e.g., whether a symbol is in an uplink or downlink direction or flexible) according to a semi-static configuration or a dynamic configuration. For example, the base station 105-c may indicate a semi-static configuration to the UE 115-c via semi-static control signaling 302. Semi-static control signaling, in some examples, may include RRC signaling. Additionally or alternatively, base station 105-c may indicate a dynamic configuration to the UE 115-c via dynamic control signaling 301. Dynamic control signaling 301 may include a slot format indication (SFI) DCI (e.g., DCI format 2_0), one or both of an uplink scheduling DCI or a downlink scheduling DCI (e.g., DCI formats 0_0, 0_1, 1_0, 1_1, or 2_3), or a higher layer configuration.

The semi-static control signaling 302 may indicate a common slot format (i.e., tdd-UL-DL-ConfigurationCommon) and a dedicated slot format (i.e., tdd-UL-DL-ConfigurationDedicated). The common slot format may indicate a slot format per slot 310 over a slot set 305 (e.g., a number of slots 310) that is common to one or more UEs 115 communicating with the base station 105-c (e.g., the common slot format configuration may be a cell-specific slot format configuration). For example, in some examples, the common slot format may indicate that each symbol of slots 310-a, 310-b, and 310-c and some symbols of slot 310-d may be configured as downlink symbols. Additionally, in some examples, the common slot format may indicate that each symbol of slot 310-g and some symbols of slot 310-f are uplink symbols. Additionally, in some examples, the common slot format may indicate that each symbol of slot 310-e and the remaining symbols of 310-d and 310-f (e.g., those that are not configured by the common slot format as downlink or uplink symbols) are flexible symbols.

The dedicated slot format may override (e.g., reconfigure, replace) flexible symbols per slot over the slot set 305 (e.g., the number of slots 310) provided by the common format. The dedicated slot format configuration may be a UE-specific slot format configuration (e.g., may be specific to the UE 115-c). For example, in some examples, the dedicated format may reconfigure some symbols of slot 310-d indicated by the common format as flexible symbols to serve as uplink symbols; may reconfigure each symbol of slot 310-e to serve as downlink symbols; and may reconfigure symbols of slot 310-f indicated by the common format as flexible symbols to serve as uplink symbols. Additionally, the dedicated slot format may indicate that the remaining symbols of slot 310-d indicated by the common format as flexible symbols are to remain as flexible symbols.

The dynamic control signaling 301 may indicate a dynamic slot format, either explicitly (e.g., if an SFI DCI) or implicitly (e.g., if an uplink or downlink scheduling DCI). The dynamic control signaling 301 may indicate an uplink or downlink direction for a semi-statically configured flexible symbol (e.g., configured via the common slot format, the dedicated slot format, or both). For example, in some examples, the dedicated format may reconfigure symbols of slot 310-d indicated by the dedicated format as flexible symbols to serve as downlink symbols. It should be noted that, in some examples, the dynamic slot format may be configured to reconfigure symbols of a slot 310 indicated by the common format as flexible symbols to serve as downlink or uplink symbols. Additionally, the dynamic slot format may indicate that flexible symbols configured by the common slot format or the dedicated slot format are to remain flexible symbols.

The UE 115-c may support semi-statically configured slot format configurations if provided and may select whether to support the SFI DCI or not (e.g., based on a UE capability report transmitted by the UE 115-c). The examples described with reference to FIGS. 4A, 4B, and 4C, for instance, may be set up such that the UE 115-c may support some or each of the following rules or conditions. When performing slot format determination, the UE 115-c may determine that semi-statically configured downlink and uplink symbols may not be modified to serve as another type (e.g., to serve as uplink if not already uplink, to serve as downlink if not already downlink, or to serve as flexible). Additionally, the UE 115-c may determine that flexible symbols may not be used for higher layer configured downlink or uplink transmission. Additionally, the UE 115-c may determine that flexible symbols may be used for dynamically scheduled downlink or uplink transmissions based on DCI. Additionally, the UE 115-c may determine that scheduling DCI has a higher priority as compared to higher layer configuration for downlink and uplink transmissions. Additionally, the UE 115-c may determine that SFI DCI has a higher priority than higher layer configuration for downlink and uplink transmissions. Additionally, the UE 115-c may determine that scheduling DCI and SFI DCI have a same priority. Such rules or conditions may be applied to downlink reception of the CLI resource when the CLI resource is configured for intra-frequency CLI measurement as described herein.

By using a common slot format, a dedicated slot format, a dynamic slot format, or any combination thereof, the UE 115-c may determine whether each symbol within each slot 310 of the slot set 305 are uplink symbols, downlink symbols, or flexible symbols. However, it may be advantageous to apply one or more conditions to determine whether or not to measure CLI over a CLI resource that overlaps with any subset of any of the slots 310 of the slot set 305. For example, applying the one or more conditions may prioritize what type of transmissions a symbol is to carry. Scenarios which involve a UE 115, such as UE 115-c, determining whether or not to measure CLI when a CLI resource overlaps with symbols of different types may be described elsewhere herein, for example, with reference to FIGS. 4A, 4B, and 4C.

Figure 4A:
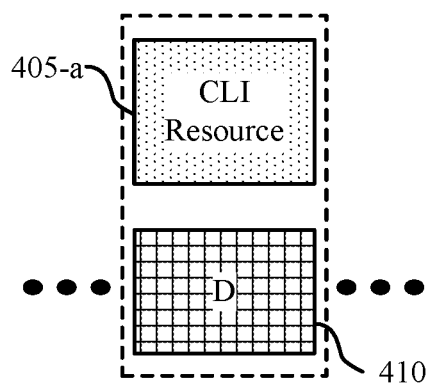
FIGS. 4A, 4B, and 4C illustrate examples of CLI resource overlap scenarios that support slot formats for intra-frequency CLI measurement in accordance with aspects of the present disclosure.
Figure 4B:
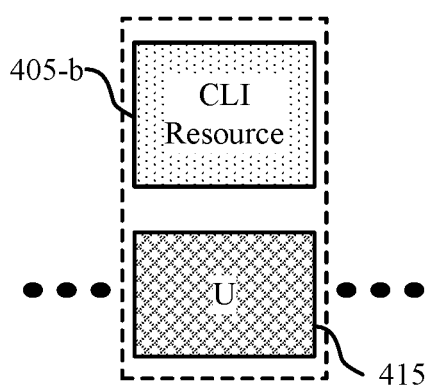
Figure 4C:
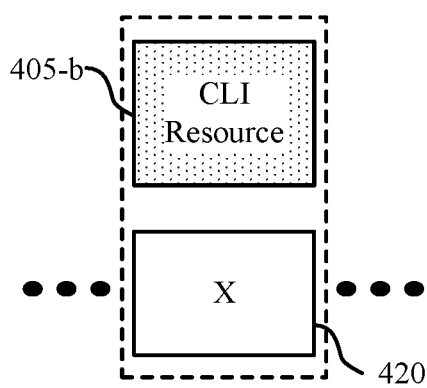

FIGS. 4A, 4B, and 4C illustrate an examples of CLI resource overlap scenarios 400-a, 400-b, and 400-c that support slot formats for intra-frequency CLI measurement in accordance with aspects of the present disclosure. In some examples, CLI resource overlap scenarios 400-a, 400-b, and 400-c may be implemented by aspects of wireless communications system 100 or wireless communications system 200, or both. For example, CLI resource overlap scenarios 400-a, 400-b, and 400-c may represent scenarios in which a resource configured for measuring CLI at a UE 115 overlaps (e.g., in time, frequency, or both) with a symbol.

In FIG. 4A, CLI resource 405-a, which may also be referred to as a CLI measurement resource, may overlap with downlink symbol 410 of a UE 115, which may be an example of a downlink symbol 210 as described with reference to FIG. 2. CLI resource 405-a may be configured for periodic measurement by higher layers (e.g., via semi-static control signaling, such as RRC signaling) to measure CLI in a set of symbols of the slot in which downlink symbol 410 resides. Additionally or alternatively, the UE 115 may receive a corresponding indication by dynamic control signaling (e.g., a DCI) that configures CLI resource 405-*a* or triggers a semi-persistently scheduled (SPS) or aperiodic measurement in CLI resource 405-*a*, or both. Downlink symbol 410 may be one of a set of symbols that overlap CLI resource 405-*a*.

If downlink symbol 410 is indicated as downlink by a common format or a dedicated format of semi-static control signaling 302; if the common slot format or dedicated slot format indicate that the downlink symbol 410 is flexible but a dynamic slot format of dynamic control signaling 301 indicates that the symbol is downlink; or if the common slot format or dedicated slot format are unavailable (e.g., due to the UE 115 not receiving semi-static control signaling 302) but the dynamic slot format indicates downlink symbol 410 as downlink, then the downlink symbol 410 may be available for the UE 115 to receive CLI resource 405-*a* in the downlink symbol 410 (e.g., determining or proceeding as if that the other symbols of the set of symbols, if present, are downlink as well based on one or more rules or conditions). As such, as noted herein, downlink symbols may be used for downlink transmission but not for uplink transmissions. The UE 115 may perform the reception or measurement in cases where CLI resource 405-*a* is configured for a periodic CLI measurement based on a higher layer configuration (e.g., via semi-static control signaling) or in cases where CLI resource 405-*a* is configured for a semi-persistent or aperiodic measurement.

In FIG. 4B, CLI resource 405-*b*, which may also be referred to as a CLI measurement resource, may overlap with uplink symbol 415 of a UE 115, which may be an example of an uplink symbol 220 as described with reference to FIG. 2. CLI resource 405-*b* may be configured for periodic measurement by higher layers (e.g., via semi-static control signaling, such as RRC signaling) to measure CLI in a set of symbols of the slot in which uplink symbol 415 resides. Additionally or alternatively, the UE 115 may receive a corresponding indication by dynamic control signaling (e.g., a DCI) that configures CLI resource 405-*b* or triggers a semi-persistently scheduled (SPS) or aperiodic measurement in CLI resource 405-*b*, or both. Uplink symbol 415 may be one of a set of symbols that overlap CLI resource 405-*b*.

If uplink symbol 415 is indicated as uplink by a common format or a dedicated format of semi-static control signaling 302; if the common slot format or dedicated slot format indicate that the uplink symbol 415 is flexible but a dynamic slot format of dynamic control signaling 301 indicates that the symbol is uplink; or if the common slot format or dedicated slot format are unavailable (e.g., due to the UE 115 not receiving semi-static control signaling 302) but the dynamic slot format indicates uplink symbol 415 as uplink, the uplink symbol 415 may be unavailable for the UE 115 to receive CLI resource 405-*b* in the uplink symbol 415. Thus, when CLI resource 405-*b* overlaps (e.g., at least partially or completely) with the set of symbols of the slot, the UE 115 may refrain from measuring CLI over CLI resource 405-*b*. As such, as noted herein, uplink symbols may be used for uplink transmissions but not for downlink transmissions.

The UE 115 may perform the reception or measurement in cases where CLI resource 405-*b* is configured for a periodic CLI measurement based on a higher layer configuration (e.g., via semi-static control signaling) or in cases where CLI resource 405-*b* is configured for a semi-persistent or aperiodic measurement. Refraining from measuring CLI in CLI resource 405-*b* when the dynamic format indicates that uplink symbol 415 is an uplink symbol in cases where a higher layer configuration configures CLI resource 405-*b* may correspond to SFI DCI having a higher priority than higher level configuration signaling.

In FIG. 4C, CLI resource 405-*c*, which may also be referred to as a CLI measurement resource, may overlap with flexible symbol 420 of a UE 115, which may be an example of a flexible symbol 215 as described with reference to FIG. 2. CLI resource 405-*c* may be configured for periodic measurement by higher layers (e.g., via semi-static control signaling, such as RRC signaling) to measure CLI in a set of symbols of the slot in which flexible symbol 420 resides. Additionally or alternatively, the UE 115 may receive a corresponding indication by dynamic control signaling (e.g., a DCI) that configures CLI resource 405-*c* or triggers a semi-persistently scheduled (SPS) or aperiodic measurement in CLI resource 405-*c*, or both. Flexible symbol 420 may be one of a set of symbols overlapping CLI resource 405-*c*.

In cases where CLI resource 405-*c* is configured via a higher layer configuration (e.g., via semi-static control signaling and not dynamic control signaling), when the common slot format or the dedicated slot format indicate that flexible symbol 420 is flexible or when the common slot format and the dedicated slot format are not provided (e.g., due to the UE 115 failing to detect semi-static control signaling 302), and if the UE 115 detects dynamic control signaling 301 indicating that flexible symbol 420 is flexible, the UE 115 may refrain from measuring CLI over CLI resource 405-*c*. Refraining from measuring the CLI in such cases may correspond to flexible symbols not being used for higher-layer-configured downlink transmissions.

Additionally, in cases where CLI resource 405-*c* is configured via a higher layer configuration (e.g., via semi-static control signaling), when the common slot format or the dedicated slot format indicate that flexible symbol 420 is flexible or when the common slot format and the dedicated slot format are not provided (e.g., due to the UE 115 failing to detect semi-static control signaling 302), and when the UE 115 is configured with support for SFI DCI (e.g., a DCI with DCI format 2_0) but does not detect the SFI DCI, the UE 115 may refrain from measuring the CLI over CLI resource 405-*c*. Refraining from measuring the CLI in such cases may correspond to flexible symbols not being used for higher-layer-configured downlink transmissions.

Alternatively, in cases where CLI resource 405-*c* is configured via dynamic control signaling (e.g., a DCI), when the UE 115 is not configured to receive SFI DCI; when the common slot format or the dedicated slot format indicate that flexible symbol 420 is flexible or when the common slot format and the dedicated slot format are not provided (e.g., due to the UE 115 failing to detect semi-static control signaling 302), the UE 115 may measure the CLI in CLI resource 405-*c* if the UE 115 receives a corresponding indicated by the DCI that triggers CLI measurement (e.g., and if the other symbols of the set overlapping CLI resource 405-*c* are downlink or flexible symbols). Additionally, if in cases where CLI resource 405-*c* is configured via dynamic control signaling (e.g., a DCI), when the common slot format or the dedicated slot format indicate that flexible symbol 420 is flexible or when the common slot format and the dedicated slot format are not provided (e.g., due to the UE 115 failing to detect semi-static control signaling 302); when the UE detects an SFI DCI that indicates that flexible symbol 420 is flexible; and when the UE 115 detects a DCI indicating to the UE 115 to measure CLI in CLI resource 405-*c*, the UE 115 may measure CLI in CLI resource 405-*c*

(e.g., if the other symbols of the set overlapping CLI resource 405-*c* are downlink or flexible symbols).

Additionally, in cases where CLI resource 405-*c* is configured via dynamic control signaling (e.g., a DCI), when the UE 115 is not configured to receive SFI DCI; when the common slot format or the dedicated slot format indicate that flexible symbol 420 is flexible or when the common slot format and the dedicated slot format are not provided (e.g., due to the UE 115 failing to detect semi-static control signaling 302); and if the UE 115 is configured to receive an SFI DCI but does not detect an SFI DCI providing a dynamic slot format for the slot, the UE 115 may measure CLI in CLI resource 405-*c* is the UE 115 receives a corresponding indication via dynamic control signaling (e.g., a DCI) that triggers the measurement (and if the other symbols of the set overlapping CLI resource 405-*c* are downlink or flexible symbols). Additionally, in cases where CLI resource 405-*c* is configured via dynamic control signaling (e.g., a DCI), when the common slot format or the dedicated slot format indicate that flexible symbol 420 is flexible or when the common slot format and the dedicated slot format are not provided (e.g., due to the UE 115 failing to detect semi-static control signaling 302), the UE 115 may determine that it is not to receive an SFI DCI indicating that the flexible symbol 420 is an uplink symbol and may detect dynamic control signaling (e.g., a DCI format) indicating to the UE 115 to measure CLI in CLI resource 405-*c* in at least one symbol from the set of symbols of the slot to which flexible symbol 420 corresponds. Measuring CLI in such cases may correspond to scheduling DCI and SFI DCI having a same level of priority.

In cases where the UE 115 is configured by a higher layer (e.g., via semi-static control signaling 302) to receive CLI resource 405-*b*, the UE 115 may refrain from measuring CLI over a CLI resource 405 if the UE 115 detects a DCI whose format (e.g., DCI format 0_0, 0_1, 1_0, 1_1, or 2_3) indicates to the UE 115 to transmit a physical uplink shared channel (PUSCH) transmission, a physical uplink control channel (PUCCH) transmission, a physical random access channel (PRACH) transmission, or a sounding reference signal (SRS) in at least one symbol of the set of symbols overlapping with the CLI resource 405. Refraining from measuring CLI in such scenarios may correspond to scheduling DCI having a higher priority than higher layer configuration transmissions (e.g., semi-static control signaling).

FIGS. 4A, 4B, and 4C describe scenarios in which a CLI resource 405 overlaps with a downlink symbol 410, an uplink symbol 415, or a flexible symbol 420. There may also be scenarios in which a CLI resource overlaps with a PRACH occasion or a threshold number of symbols preceding the PRACH occasion. Such a scenario may be described in further detail elsewhere herein, for example, with reference to FIG. 5.

Figure 5:
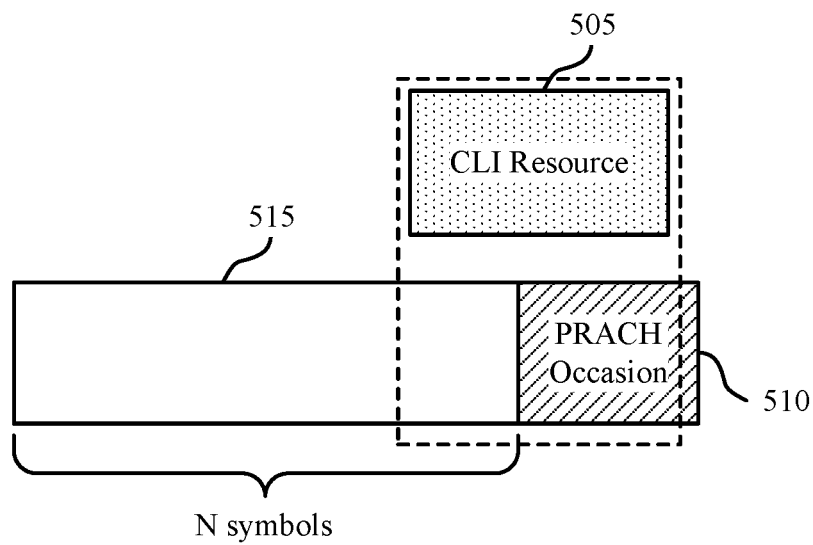
FIG. 5 illustrates an example of a CLI resource overlap scenario that supports slot formats for intra-frequency CLI measurement in accordance with aspects of the present disclosure.

FIG. 5 illustrates an example of a CLI resource overlap scenario 500 that supports slot formats for intra-frequency CLI measurement in accordance with aspects of the present disclosure. In some examples, CLI resource overlap scenario 500 may be implemented by aspects of wireless communications systems 100 or 200, or both. For example, CLI resource overlap scenarios 500 may represent a scenario in which a resource configured for measuring CLI at a UE 115 overlaps with a transmission occasion for PRACH.

CLI resource 505 may at least partially overlap PRACH occasion 510 or a number of symbols 515 preceding the PRACH occasion 510, or both. For a set of symbols corresponding to a valid PRACH occasion 510 and a number of symbols 515 before the valid PRACH occasion, the UE 115 may not measure CLI over the CLI resource 505 in the slot if a reception may overlap with a symbol from the set of symbols. By refraining from measuring the CLI resource 505 in such scenarios, the UE 115 may be able to use the PRACH occasion 510 for transmitting a PRACH transmission, among other advantages.

Figure 6:
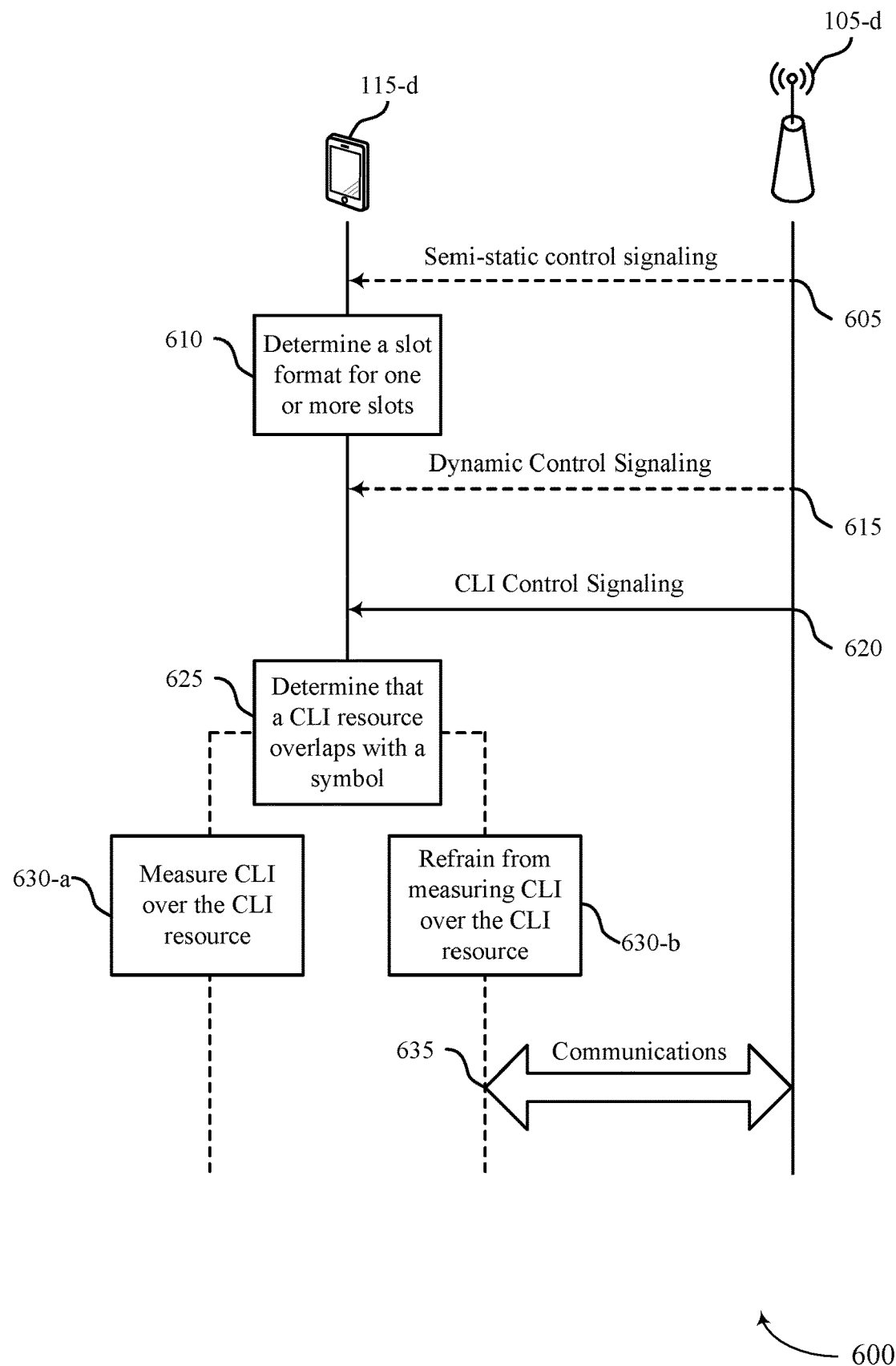
FIG. 6 illustrates an example of a process flow that supports slot formats for intra-frequency CLI measurement in accordance with aspects of the present disclosure.

FIG. 6 illustrates an example of a process flow 600 that supports slot formats for intra-frequency CLI measurement in accordance with aspects of the present disclosure. In some examples, process flow 600 may be implemented by aspects of wireless communications system 100. For example, process flow 600 may be implemented by a UE 115-*d*, which may be an example of a UE 115 as described with reference to FIG. 1 or 2, or both, and a base station 105-*d*, which may be an example of a base station 105 as described with reference to FIG. 1 or 2, or both.

At 605, the base station 105-*d* may transmit semi-static control signaling (e.g., RRC signaling) to the UE 115-*d* indicating a slot format for one or more slots (e.g., via a common slot format or dedicated slot format, or both, included in the semi-static control signaling). The semi-static control signaling may indicate that a symbol of a slot of the one or more slots is uplink, downlink, or flexible. The UE 115-*d* may receive the semi-static control signaling.

At 610, the UE 115-*d* may determine a slot format for the one or more slots.

At 615, the base station 105-*d* may transmit dynamic control signaling (e.g., DCI) to the UE 115-*d*. The dynamic control signaling may indicate that the symbol of the slot of the one or more slots is uplink, downlink, or flexible. In cases where semi-static control signaling transmitted at 605 indicates that the symbol is a flexible symbol and the dynamic control signaling indicates that the symbol is a downlink symbol, the UE 115-*d* may determine that the symbol is a downlink symbol based on the dynamic control signaling overriding the semi-static control signaling. In cases where semi-static control signaling transmitted at 605 indicates that the symbol is a flexible symbol and the dynamic control signaling indicates that the symbol is an uplink symbol, the UE 115-*d* may determine that the symbol is an uplink symbol based on the dynamic control signaling overriding the semi-static control signaling. The UE 115-*d* may receive the dynamic control signaling.

At 620, the base station 105-*d* may transmit control signaling indicating a resource for measuring CLI. The control signaling indicating the resource may include semi-static control signaling (e.g., RRC signaling) indicating the resource. In some examples, the resource may be periodic based on the control signaling including semi-static control signaling. Additionally or alternatively, the control signaling indicating the resource may include dynamic control signaling (e.g., DCI) indicating the resource. The resource may be aperiodic or semi-persistently scheduled based on the control signaling including the dynamic control signaling.

At 625, the UE 115-*d* may determine that the indicate resource overlaps with the symbol of a slot of the one or more slots.

In some examples, the UE 115-*d* may perform 630-*a* based on the dynamic control signaling at 615 indicating that the overlapping symbol is a downlink symbol or a flexible symbol. For example, if the control signaling at 620 includes dynamic control signaling that indicates the resource and the overlapping symbol is a flexible symbol, the UE 115-*d* may perform 630-*a*. In some such cases that the dynamic control signaling at 615 indicates that the overlapping symbol is a downlink symbol or a flexible symbol, performing 630-*a* may be based on the semi-static control signaling at 605 indicating that the overlapping symbol is a flexible symbol. Additionally, the UE 115-*d* may perform 630-*a* if a common slot format or a dedicated slot format of the semi-static control signaling at 605 indicates that the overlapping symbol is a downlink symbol. Additionally, UE 115-*d* may perform 630-*a* if the UE 115-*d* fails to detect at least one dynamic control signaling at 615 and semi-static control signaling at 605 but the control signaling at 620 includes dynamic control signaling indicating the resource.

In some examples, the UE 115-*d* may perform 630-*b* and 635 based on the dynamic control signaling at 615 indicating that the overlapping symbol is an uplink symbol or a flexible symbol. For example, if the control signaling at 620 includes semi-static control signaling that indicates the resource and the overlapping symbol is a flexible symbol, the UE 115-*d* may perform 630-*b* and 635. In some such cases that the dynamic control signaling at 615 indicates that the overlapping symbol is an uplink symbol or a flexible symbol, performing 630-*b* and 635 may be based on the semi-static control signaling at 605 indicating that the overlapping symbol is a flexible symbol. Additionally, the UE 115-*d* may perform 630-*b* and 635 if a common slot format or a dedicated slot format of the semi-static control signaling at 605 indicates that the overlapping symbol is an uplink symbol. Additionally, the UE 115-*d* may perform 630-*a* if the UE 115-*d* fails to detect at least one dynamic control signaling at 615 and semi-static control signaling at 605 but the control signaling at 620 includes semi-static control signaling indicating the resource.

Additionally, the UE 115-*d* may perform 630-*b* and 635 if the symbol is associated with an occasion for transmitting a random access channel transmission or if a one of a set of symbols in which the symbol resides overlaps with an uplink resource (e.g., a resource for transmitting a PUSCH transmission, a PUCCH transmission, a PRACH transmission, an SRS, or any combination thereof). In some instances of the former case, the symbol may be within a threshold number of symbols prior to the occasion for transmitting the random access channel transmission.

At 630-*a*, the UE 115-*d* may measure the CLI over the indicated resource. Measuring the CLI over the resource may involve measuring an RSSI, a RSRP of an SRS received from a UE 115 (e.g., an aggressor UE 115), or both. In cases where the UE 115-*d* receives the SRS, the UE 115-*d* may receive the SRS within an active BWP for measuring CLI.

At 630-*b*, the UE 115-*d* may refrain from measuring the CLI over the indicated resource. At 635, the UE 115-*d* may communicate with base station 105-*d* based on refraining from measuring the CLI. If the symbol overlapping with the indicated resource is associated with the occasion for transmitting the random access channel transmission, the UE 115-*d* may transmit the random access channel transmission over the occasion at 635. Additionally or alternatively, if the symbol is one of the set of symbols that has a symbol overlapping with an uplink resource, the UE 115-*d* may transmit a PUSCH transmission, a PUCCH transmission, a PRACH transmission, an SRS, or any combination thereof of at 635.

Figure 7:
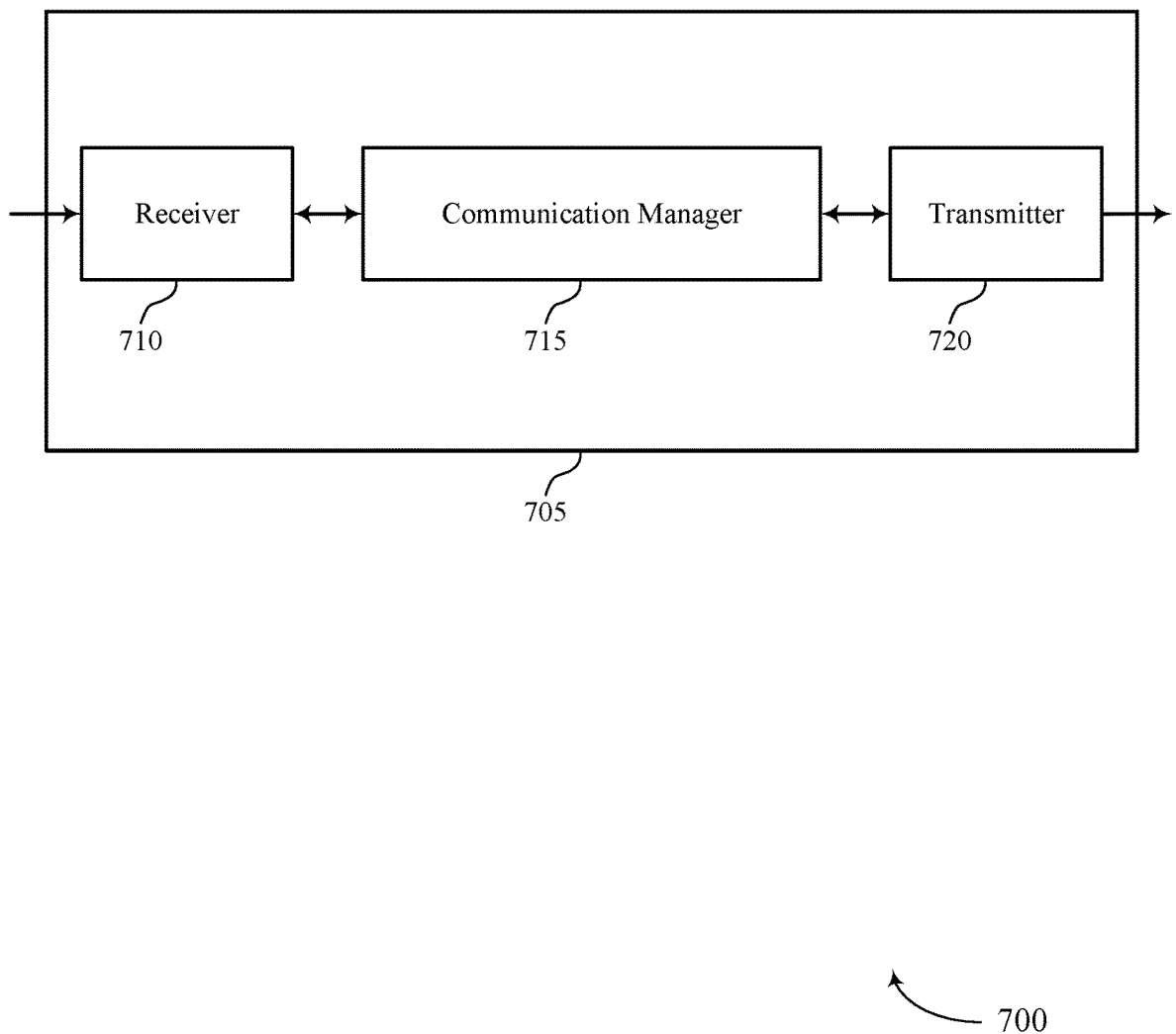
FIGS. 7 and 8 show block diagrams of devices that support slot formats for intra-frequency CLI measurement in accordance with aspects of the present disclosure.

FIG. 7 shows a block diagram 700 of a device 705 that supports slot formats for intra-frequency CLI measurement in accordance with aspects of the present disclosure. The device 705 may be an example of aspects of a UE 115 as described herein. The device 705 may include a receiver 710, a communication manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to slot formats for intra-frequency CLI measurement, etc.). Information may be passed on to other components of the device 705. The receiver 710 may be an example of aspects of the transceiver 1015 described with reference to FIG. 10. The receiver 710 may utilize a single antenna or a set of antennas.

The communication manager 715 may determine a slot format for one or more slots. The communication manager 715 may receive control signaling indicating a resource for measuring CLI. The communication manager 715 may determine that the indicated resource overlaps with a symbol of a slot of the one or more slots, where the symbol is a downlink symbol or a flexible symbol. The communication manager 715 may measure the CLI over the resource based on the symbol of the slot of the one or more slots overlapping with the resource.

The communication manager 715 may determine a slot format for one or more slots. The communication manager 715 may receive control signaling indicating a resource for measuring CLI. The communication manager 715 may determine that the indicated resource overlaps with a symbol of a slot of the one or more slots, where the symbol is an uplink symbol or a flexible symbol. The communication manager 715 may refrain from measuring the CLI over the indicated resource based on the symbol overlapping with the indicated resource including the uplink symbol or the flexible symbol. The communication manager 715 may communicate based on refraining from measuring the CLI.

The communication manager 715 may receive control signaling indicating a resource for measuring CLI. The communication manager 715 may determine that the indicated resource overlaps with a symbol associated with an occasion for transmitting a random access channel transmission. The communication manager 715 may refrain from measuring the CLI over the indicated resource based on the indicated resource overlapping with the symbol. The communication manager 715 may transmit the random access channel transmission over the occasion based on refraining from measuring the CLI. The communication manager 715 may be an example of aspects of the communication manager 1010 described herein.

The communication manager 715, or its sub-components, may be implemented in hardware, code (e.g., software or firmware) executed by a processor, or any combination thereof. If implemented in code executed by a processor, the functions of the communication manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 715, or its sub-components, may be physically located at various positions, including being distributed such that portions of functions are implemented at different physical locations by one or more physical components. In some examples, the communication manager 715, or its sub-components, may be a separate and distinct component in accordance with various aspects of the present disclosure. In some examples, the communication manager 715, or its sub-components, may be combined with one or more other hardware components, including but not limited to an input/output (I/O) component, a transceiver, a network server, another computing device, one or more other components described in the present disclosure, or any combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1015 described with reference to FIG. 10. The transmitter 720 may utilize a single antenna or a set of antennas.

Figure 8:
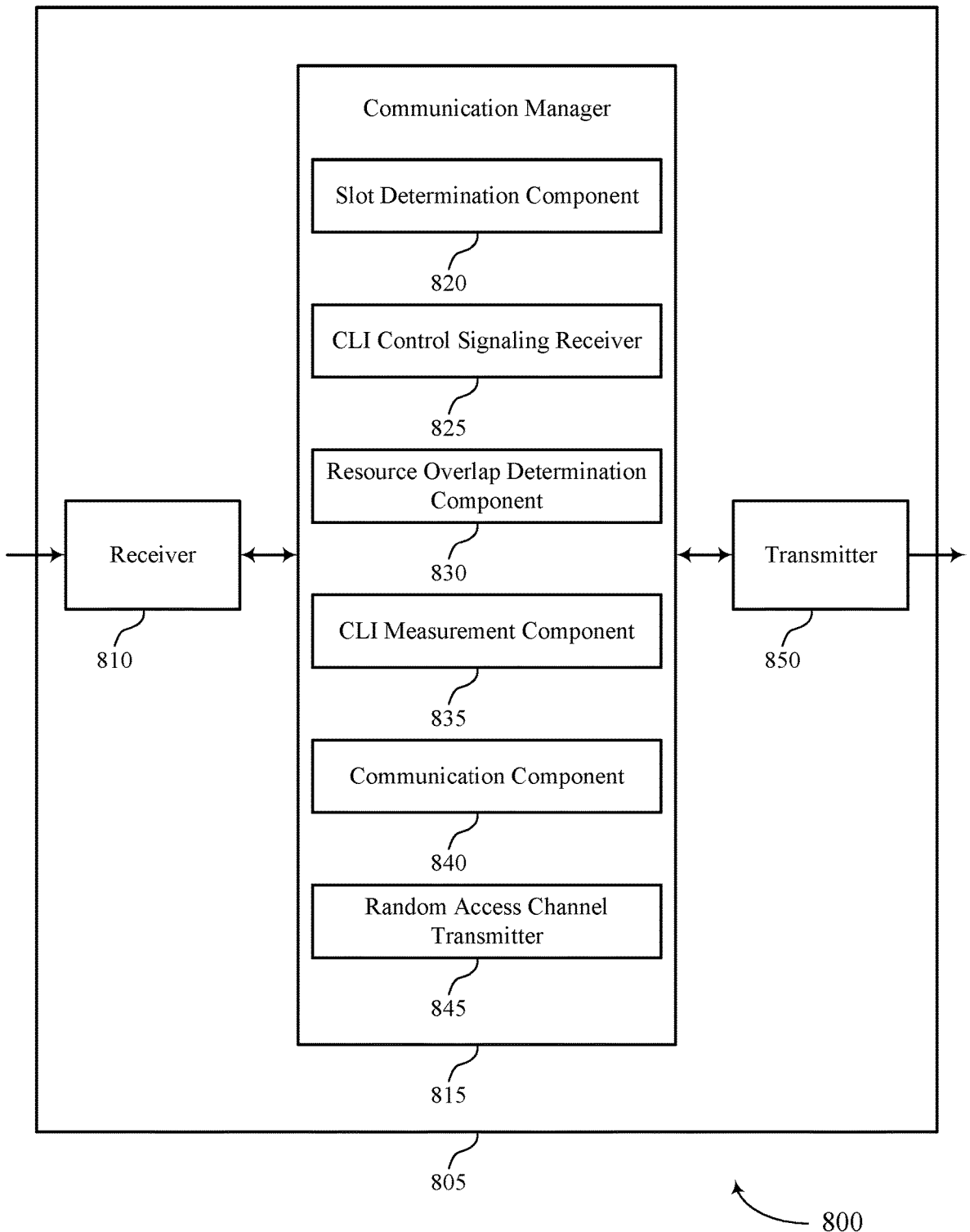

FIG. 8 shows a block diagram 800 of a device 805 that supports slot formats for intra-frequency CLI measurement in accordance with aspects of the present disclosure. The device 805 may be an example of aspects of a device 705, or a UE 115 as described herein. The device 805 may include a receiver 810, a communication manager 815, and a transmitter 850. The device 805 may also include a processor. Each of these components may be in communication with one another (e.g., via one or more buses).

The receiver 810 may receive information such as packets, user data, or control information associated with various information channels (e.g., control channels, data channels, and information related to slot formats for intra-frequency CLI measurement, etc.). Information may be passed on to other components of the device 805. The receiver 810 may be an example of aspects of the transceiver 1015 described with reference to FIG. 10. The receiver 810 may utilize a single antenna or a set of antennas.

The communication manager 815 may be an example of aspects of the communication manager 715 as described herein. The communication manager 815 may include a slot determination component 820, a CLI control signaling receiver 825, a resource overlap determination component 830, a CLI measurement component 835, a communication component 840, and a random access channel transmitter 845. The communication manager 815 may be an example of aspects of the communication manager 1010 described herein.

The slot determination component 820 may determine a slot format for one or more slots.

The CLI control signaling receiver 825 may receive control signaling indicating a resource for measuring CLI.

The resource overlap determination component 830 may determine that the indicated resource overlaps with a symbol of a slot of the one or more slots, where the symbol is a downlink symbol or a flexible symbol. The resource overlap determination component 830 may determine that the indicated resource overlaps with a symbol of a slot of the one or more slots, where the symbol is an uplink symbol or a flexible symbol. The resource overlap determination component 830 may determine that the indicated resource overlaps with a symbol associated with an occasion for transmitting a random access channel transmission.

The CLI measurement component 835 may measure the CLI over the resource based on the symbol of the slot of the one or more slots overlapping with the resource. The CLI measurement component 835 may refrain from measuring the CLI over the indicated resource based on the symbol overlapping with the indicated resource including the uplink symbol or the flexible symbol. The CLI measurement component 835 may refrain from measuring the CLI over the indicated resource based on the indicated resource overlapping with the symbol.

The communication component 840 may communicate based on refraining from measuring the CLI.

The random access channel transmitter 845 may transmit the random access channel transmission over the occasion based on refraining from measuring the CLI.

The transmitter 850 may transmit signals generated by other components of the device 805. In some examples, the transmitter 850 may be collocated with a receiver 810 in a transceiver module. For example, the transmitter 850 may be an example of aspects of the transceiver 1015 described with reference to FIG. 10. The transmitter 850 may utilize a single antenna or a set of antennas.

Figure 9:
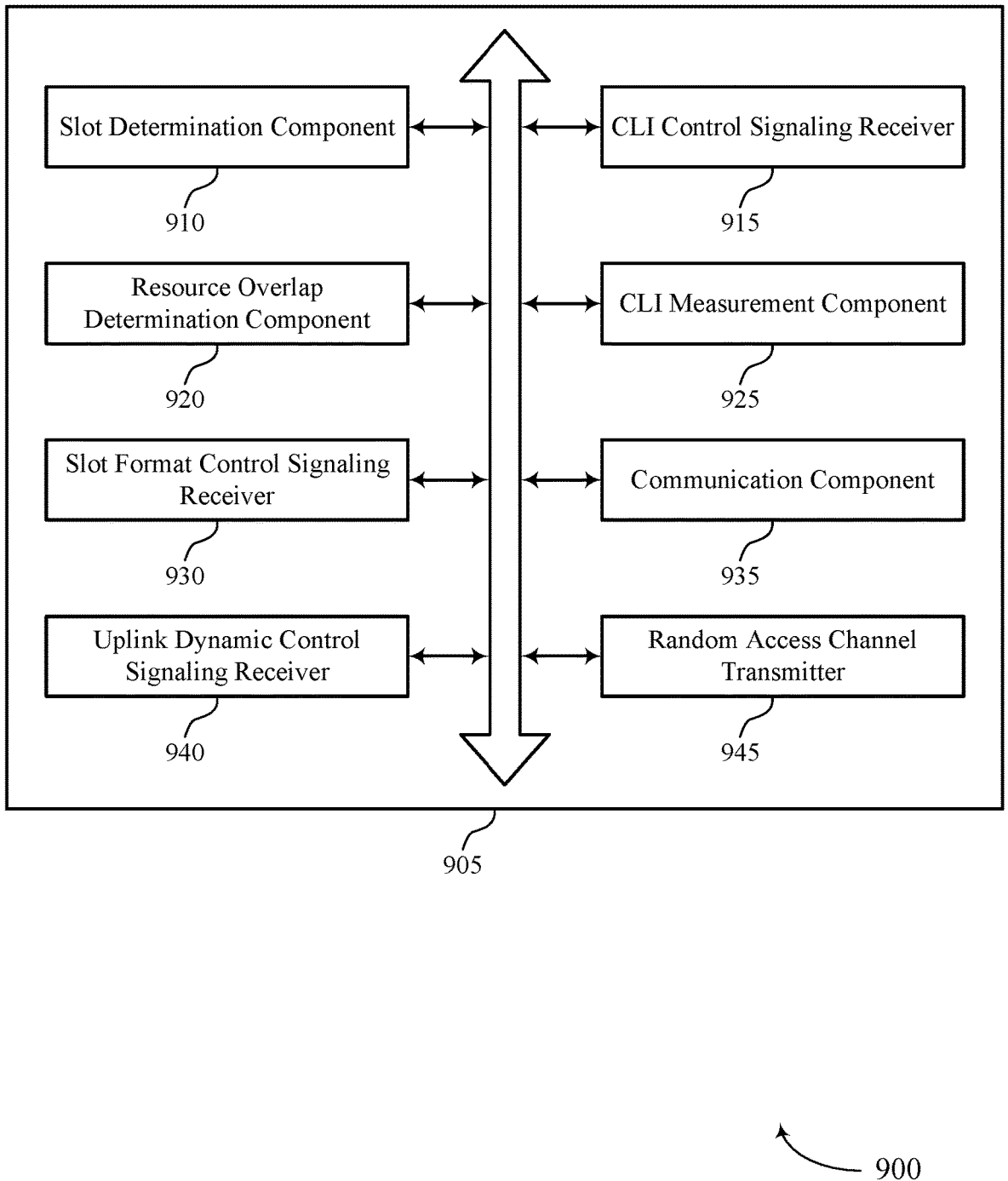
FIG. 9 shows a block diagram of a communication manager that supports slot formats for intra-frequency CLI measurement in accordance with aspects of the present disclosure.

FIG. 9 shows a block diagram 900 of a communication manager 905 that supports slot formats for intra-frequency CLI measurement in accordance with aspects of the present disclosure. The communication manager 905 may be an example of aspects of a communication manager 715, a communication manager 815, or a communication manager 1010 described herein. The communication manager 905 may include a slot determination component 910, a CLI control signaling receiver 915, a resource overlap determination component 920, a CLI measurement component 925, a slot format control signaling receiver 930, a communication component 935, an uplink dynamic control signaling receiver 940, and a random access channel transmitter 945. Each of these modules may communicate, directly or indirectly, with one another (e.g., via one or more buses).

The slot determination component 910 may determine a slot format for one or more slots.

The CLI control signaling receiver 915 may receive control signaling indicating a resource for measuring CLI. In some examples, the control signaling indicating the resource includes second dynamic control signaling indicating the resource, where measuring the CLI over the resource that overlaps with the flexible symbol is based on the control signaling including the second dynamic control signaling. In some examples, the control signaling indicating the resource includes dynamic control signaling indicating the resource, where measuring the CLI over the resource is based on the control signaling including the dynamic control signaling and based on the semi-static control signaling indicating that the symbol is the flexible symbol.

In some examples, the control signaling indicating the resource includes semi-static control signaling indicating the resource. In some examples, the semi-static control signaling includes RRC signaling indicating the resource. In some examples, the resource may be periodic based on the control signaling including the semi-static control signaling.

In some examples, the control signaling indicating the resource includes dynamic control signaling indicating the resource. In some examples, the dynamic control signaling includes DCI indicating the resource. In some examples, the resource may be aperiodic or semi-persistently scheduled based on control signaling including the dynamic control signaling.

In some examples, the control signaling indicating the resource includes semi-static control signaling indicating the resource, where refraining from measuring the CLI over the resource that overlaps with the flexible symbol is based on the control signaling including the semi-static control signaling. In some examples, the control signaling indicating the resource includes second semi-static control signaling indicating the resource, where refraining from measuring the CLI over the resource is based on the control signaling including the second semi-static control signaling and based on the semi-static control signaling indicating that the symbol is the flexible symbol.

The resource overlap determination component 920 may determine that the indicated resource overlaps with a symbol of a slot of the one or more slots, where the symbol is a downlink symbol or a flexible symbol. In some examples, the resource overlap determination component 920 may determine that the symbol is the downlink symbol based on the dynamic control signaling overriding the semi-static control signaling.

In some examples, the resource overlap determination component 920 may determine that the indicated resource overlaps with a symbol of a slot of the one or more slots, where the symbol is an uplink symbol or a flexible symbol. In some examples, the resource overlap determination component 920 may determine that the symbol is the uplink symbol based on the dynamic control signaling overriding the semi-static control signaling. In some examples, the resource overlap determination component 920 may determine that the indicated resource overlaps with a symbol associated with an occasion for transmitting a random access channel transmission. In some examples, the symbol may be within a threshold number of symbols prior to the occasion for transmitting the random access channel transmission.

The CLI measurement component 925 may measure the CLI over the resource based on the symbol of the slot of the one or more slots overlapping with the resource. In some examples, the CLI measurement component 925 measuring the CLI over the resource involves measuring an RSSI, an RSRP of a SRS received from a user equipment, or both. In some examples, receiving the SRS involves receiving the sounding reference signal within an active bandwidth part for measuring the CLI. In some examples, the symbol is the flexible symbol, and measuring the CLI over the resource is based on the symbol being the flexible symbol and based on the control signaling including the dynamic control signaling.

In some examples, the CLI measurement component 925 may refrain from measuring the CLI over the indicated resource based on the symbol overlapping with the indicated resource being the uplink symbol or the flexible symbol. In some examples, the symbol is the flexible symbol, where refraining from measuring the CLI over the resource that overlaps with the flexible symbol is based on the symbol including the flexible symbol and based on the control signaling including the semi-static control signaling.

In some examples, the CLI measurement component 925 may refrain from measuring the CLI over the indicated resource based on the indicated resource overlapping with the symbol.

The slot format control signaling receiver 930 may receive dynamic control signaling indicating that the symbol is the downlink symbol, where measuring the CLI over the resource is based on the dynamic control signaling indicating that the symbol is the downlink symbol. In some examples, the slot format control signaling receiver 930 may receive semi-static control signaling indicating that the symbol is the flexible symbol. In some examples, the semi-static control signaling includes RRC signaling indicating that the symbol is the flexible symbol. In some examples, the dynamic control signaling includes DCI indicating that the symbol is the downlink symbol.

In some examples, the slot format control signaling receiver 930 may receive dynamic control signaling indicating that the symbol is the flexible symbol, where measuring the CLI over the resource is based on the dynamic control signaling indicating that the symbol is the flexible symbol. In some examples, the slot format control signaling receiver 930 may receive semi-static control signaling indicating that the symbol is the flexible symbol, where measuring the CLI over the resource is based on the semi-static control signaling indicating that the symbol is the flexible symbol. In some examples, the semi-static control signaling includes RRC signaling indicating that the symbol is the flexible symbol. In some examples, the dynamic control signaling includes DCI indicating that the symbol is the flexible symbol.

In some examples, the slot format control signaling receiver 930 may receive semi-static control signaling indicating the slot format for the one or more slots, where measuring the CLI over the resource is based on the semi-static control signaling indicating the slot format for the one or more slots. In some examples, the semi-static control signaling includes a common slot format and a dedicated slot format, where measuring the CLI over the resource is based on at least one of the common slot format or the dedicated slot format indicating that the symbol is the downlink symbol.

In some examples, the slot format control signaling receiver 930 may receive dynamic control signaling indicating that the symbol is the uplink symbol, where refraining from measuring the CLI over the resource is based on the dynamic control signaling indicating that the symbol is the uplink symbol. In some examples, the slot format control signaling receiver 930 may receive semi-static control signaling indicating that the symbol is the flexible symbol. In some examples, the semi-static control signaling includes RRC signaling indicating that the symbol is the flexible symbol. In some examples, the dynamic control signaling includes DCI indicating that the symbol is the uplink symbol.

In some examples, the slot format control signaling receiver 930 may receive dynamic control signaling indicating that the symbol is the flexible symbol, where refraining from measuring the CLI over the resource is based on the dynamic control signaling indicating that the symbol is the flexible symbol. In some examples, the slot format control signaling receiver 930 may receive semi-static control signaling indicating that the symbol is the flexible symbol, where refraining from measuring the CLI over the resource is based on the semi-static control signaling indicating that the symbol is the flexible symbol. In some examples, the semi-static control signaling includes RRC signaling indicating that the symbol is the flexible symbol. In some examples, the dynamic control signaling includes DCI indicating that the symbol is the flexible symbol.

In some examples, the slot format control signaling receiver 930 may receive semi-static control signaling indicating the slot format for the one or more slots, where refraining from measuring the CLI over the resource is based on the semi-static control signaling indicating the slot format for the one or more slots. In some examples, the semi-static control signaling includes a common slot format and a dedicated slot format, where refraining from measuring the CLI over the resource is based on at least one of the common slot format or the dedicated slot format indicating that the symbol is the uplink symbol.

The communication component 935 may communicate based on refraining from measuring the CLI.

The uplink dynamic control signaling receiver 940 may receive dynamic control signaling indicating to transmit an uplink transmission over a second resource, where refraining from measuring the CLI over the resource is based on the second resource overlapping with at least one symbol of the slot of the one or more slots. In some examples, the uplink transmission includes a physical uplink shared channel transmission, a physical uplink control channel transmission, a physical random access channel transmission, a sounding reference signal, or any combination thereof.

The random access channel transmitter 945 may transmit the random access channel transmission over the occasion based on refraining from measuring the CLI.

Figure 10:
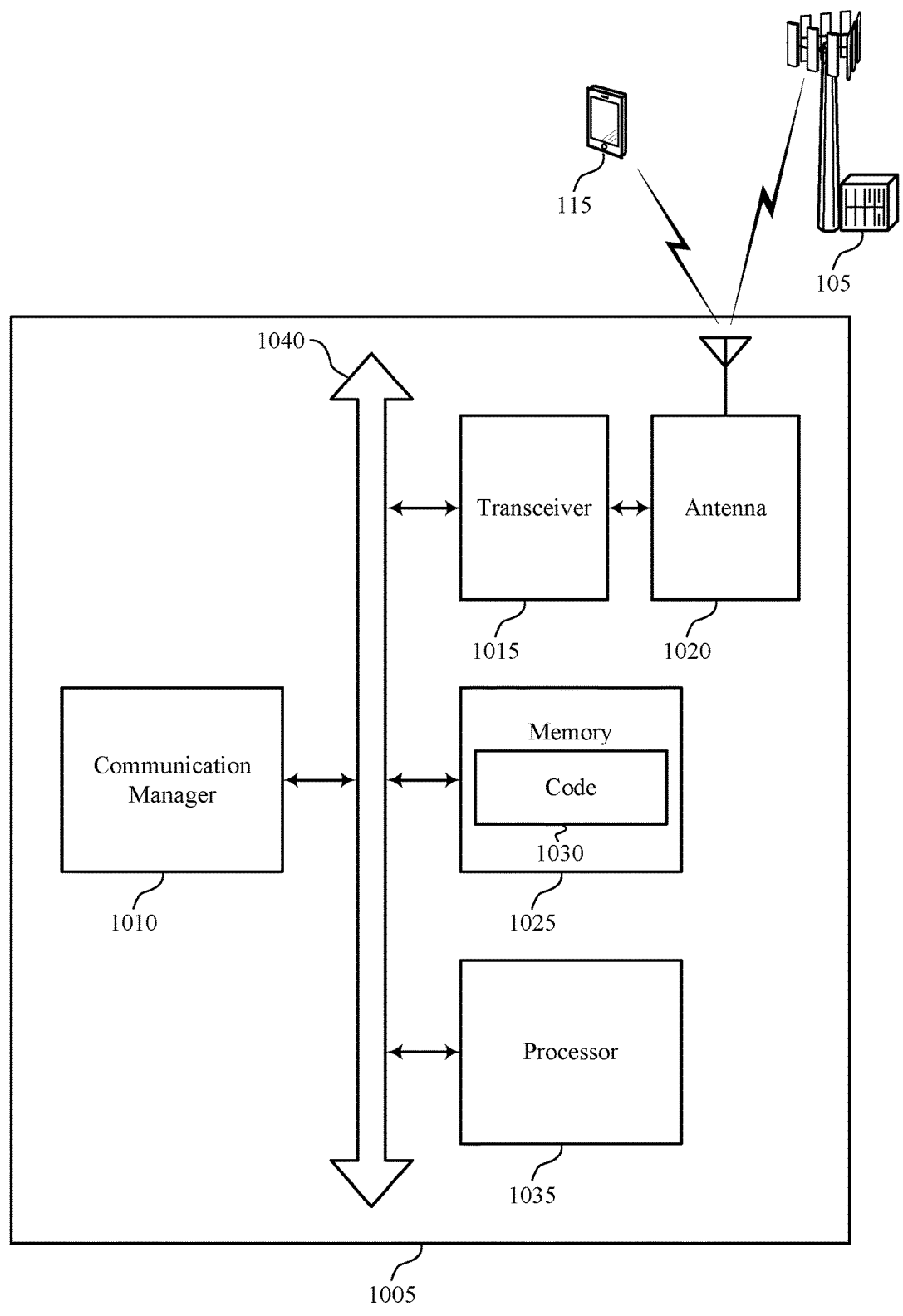
FIG. 10 shows a diagram of a system including a device that supports slot formats for intra-frequency CLI measurement in accordance with aspects of the present disclosure.

FIG. 10 shows a diagram of a system 1000 including a device 1005 that supports slot formats for intra-frequency CLI measurement in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communication manager 1010, a transceiver 1015, an antenna 1020, memory 1025, and a processor 1035. These components may be in electronic communication via one or more buses (e.g., bus 1040).

The communication manager 1010 may determine a slot format for one or more slots. The communication manager 1010 may receive control signaling indicating a resource for measuring CLI. The communication manager 1010 may determine that the indicated resource overlaps with a symbol of a slot of the one or more slots, where the symbol is a downlink symbol or a flexible symbol. The communication manager 1010 may measure the CLI over the resource based on the symbol of the slot of the one or more slots overlapping with the resource.

The communication manager 1010 may determine a slot format for one or more slots. The communication manager 1010 may receive control signaling indicating a resource for measuring CLI. The communication manager 1010 may determine that the indicated resource overlaps with a symbol of a slot of the one or more slots, where the symbol is an uplink symbol or a flexible symbol. The communication manager 1010 may refrain from measuring the CLI over the indicated resource based on the symbol overlapping with the indicated resource including the uplink symbol or the flexible symbol. The communication manager 1010 may communicate based on refraining from measuring the CLI.

The communication manager 1010 may receive control signaling indicating a resource for measuring CLI. The communication manager 1010 may determine that the indicated resource overlaps with a symbol associated with an occasion for transmitting a random access channel transmission. The communication manager 1010 may refrain from measuring the CLI over the indicated resource based on the indicated resource overlapping with the symbol. The communication manager 1010 may transmit the random access channel transmission over the occasion based on refraining from measuring the CLI.

The transceiver 1015 may communicate bi-directionally, via one or more antennas, wired, or wireless links as described above. For example, the transceiver 1015 may represent a wireless transceiver and may communicate bi-directionally with another wireless transceiver. The transceiver 1015 may also include a modem to modulate the packets and provide the modulated packets to the antennas for transmission, and to demodulate packets received from the antennas.

In some examples, the wireless device may include a single antenna 1020. However, in some examples the device may have more than one antenna 1020, which may be capable of concurrently transmitting or receiving multiple wireless transmissions.

The memory 1025 may include random-access memory (RAM) and read-only memory (ROM). The memory 1025 may store computer-readable, computer-executable code 1030 including instructions that, when executed, cause the processor to perform various functions described herein. In some examples, the memory 1025 may contain, among other things, a basic input/output system (BIOS) which may control basic hardware or software operation such as the interaction with peripheral components or devices.

The code 1030 may include instructions to implement aspects of the present disclosure, including instructions to support wireless communications. The code 1030 may be stored in a non-transitory computer-readable medium such as system memory or other type of memory. In some examples, the code 1030 may not be directly executable by the processor 1035 but may cause a computer (e.g., when compiled and executed) to perform functions described herein.

The processor 1035 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some examples, the processor 1035 may be configured to operate a memory array using a memory controller. In other cases, a memory controller may be integrated into the processor 1035. The processor 1035 may be configured to execute computer-readable instructions stored in a memory (e.g., the memory 1025) to cause the device 1005 to perform various functions (e.g., functions or tasks supporting slot formats for intra-frequency CLI measurement).

Figure 11:
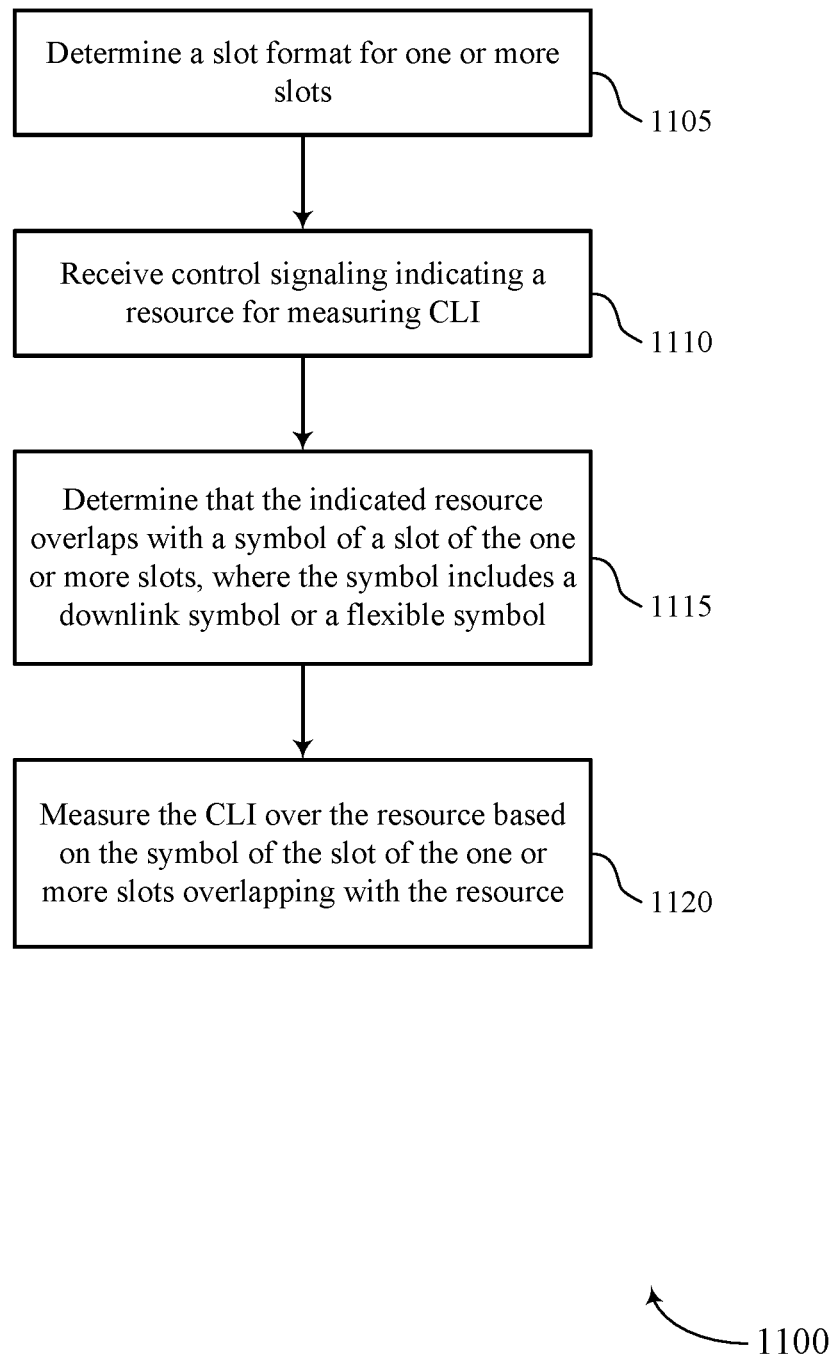
FIGS. 11 through 17 show flowcharts illustrating methods that support slot formats for intra-frequency CLI measurement in accordance with aspects of the present disclosure.

FIG. 11 shows a flowchart illustrating a method 1100 that supports slot formats for intra-frequency CLI measurement in accordance with aspects of the present disclosure. The operations of method 1100 may be implemented by a UE 115 or its components as described herein. For example, the operations of method 1100 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1105, the UE may determine a slot format for one or more slots. The operations of 1105 may be performed according to the methods described herein. In some examples, aspects of the operations of 1105 may be performed by a slot determination component as described with reference to FIGS. 7 through 10.

At 1110, the UE may receive control signaling indicating a resource for measuring CLI. The operations of 1110 may be performed according to the methods described herein. In some examples, aspects of the operations of 1110 may be performed by a CLI control signaling receiver as described with reference to FIGS. 7 through 10.

At 1115, the UE may determine that the indicated resource overlaps with a symbol of a slot of the one or more slots, where the symbol includes a downlink symbol or a flexible symbol. The operations of 1115 may be performed according to the methods described herein. In some examples, aspects of the operations of 1115 may be performed by a resource overlap determination component as described with reference to FIGS. 7 through 10.

At 1120, the UE may measure the CLI over the resource based on the symbol of the slot of the one or more slots overlapping with the resource. The operations of 1120 may be performed according to the methods described herein. In some examples, aspects of the operations of 1120 may be performed by a CLI measurement component as described with reference to FIGS. 7 through 10.

Figure 12:
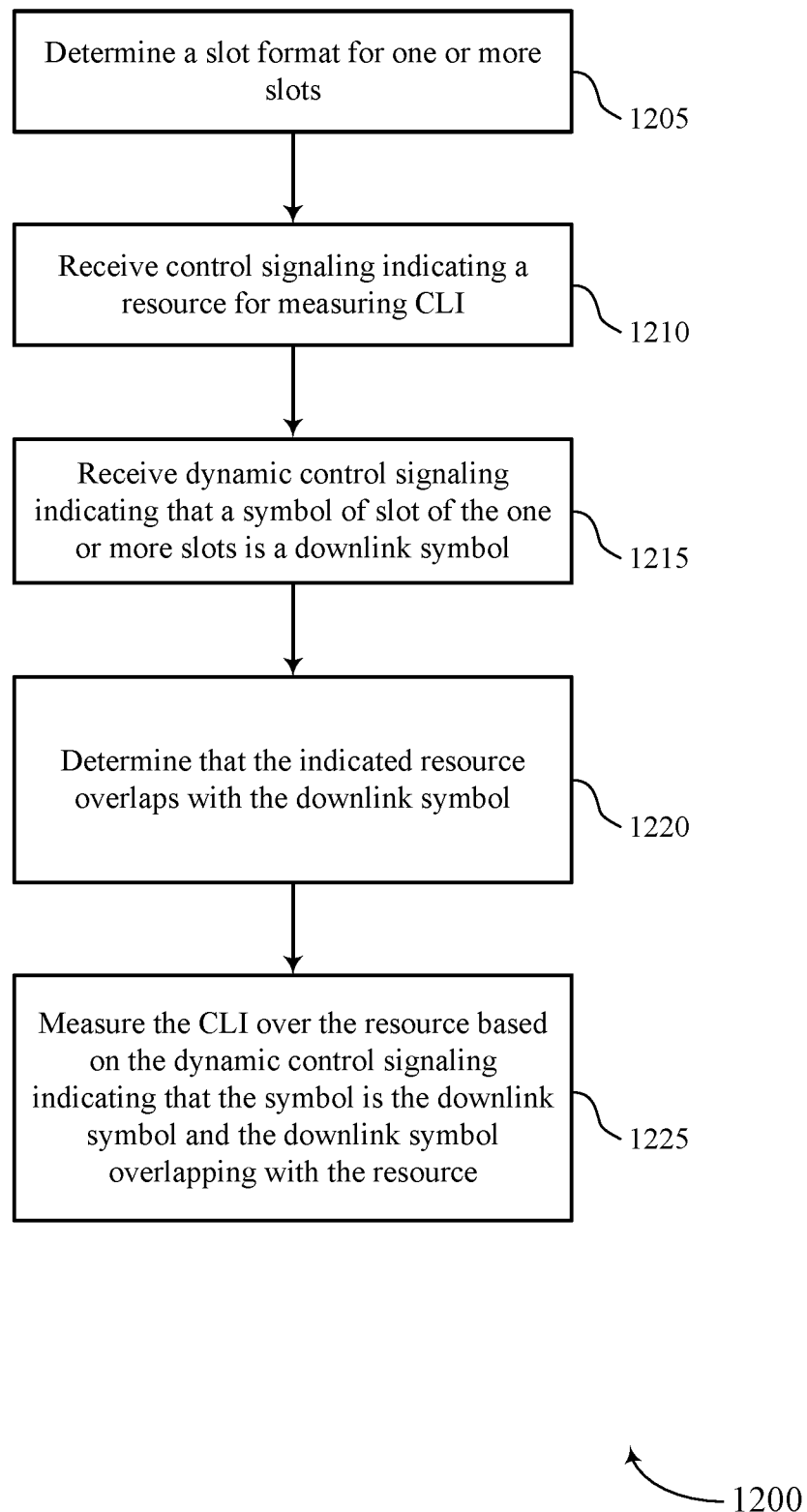

FIG. 12 shows a flowchart illustrating a method 1200 that supports slot formats for intra-frequency CLI measurement in accordance with aspects of the present disclosure. The operations of method 1200 may be implemented by a UE 115 or its components as described herein. For example, the operations of method 1200 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1205, the UE may determine a slot format for one or more slots. The operations of 1205 may be performed according to the methods described herein. In some examples, aspects of the operations of 1205 may be performed by a slot determination component as described with reference to FIGS. 7 through 10.

At 1210, the UE may receive control signaling indicating a resource for measuring CLI. The operations of 1210 may be performed according to the methods described herein. In some examples, aspects of the operations of 1210 may be performed by a CLI control signaling receiver as described with reference to FIGS. 7 through 10.

At 1215, the UE may receive dynamic control signaling indicating that a symbol of slot of the one or more slots is a downlink symbol. The operations of 1215 may be performed according to the methods described herein. In some examples, aspects of the operations of 1215 may be performed by a slot format control signaling receiver as described with reference to FIGS. 7 through 10.

At 1220, the UE may determine that the indicated resource overlaps with the downlink symbol. The operations of 1220 may be performed according to the methods described herein. In some examples, aspects of the operations of 1220 may be performed by a resource overlap determination component as described with reference to FIGS. 7 through 10.

At 1225, the UE may measure the CLI over the resource based on the dynamic control signaling indicating that the symbol is the downlink symbol and the downlink symbol overlapping with the resource. The operations of 1225 may be performed according to the methods described herein. In some examples, aspects of the operations of 1225 may be performed by a CLI measurement component as described with reference to FIGS. 7 through 10.

Figure 13:
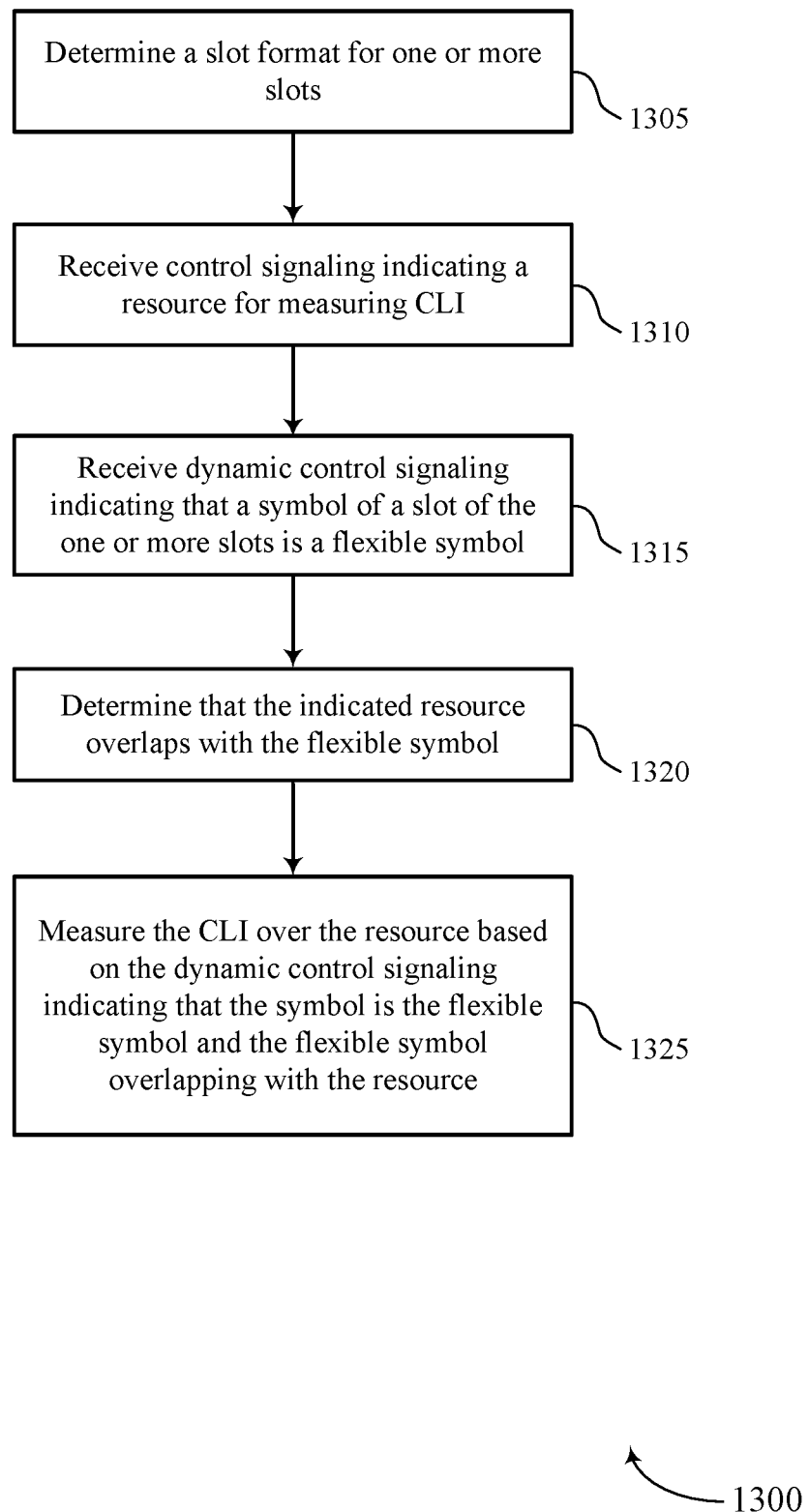

FIG. 13 shows a flowchart illustrating a method 1300 that supports slot formats for intra-frequency CLI measurement in accordance with aspects of the present disclosure. The operations of method 1300 may be implemented by a UE 115 or its components as described herein. For example, the operations of method 1300 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1305, the UE may determine a slot format for one or more slots. The operations of 1305 may be performed according to the methods described herein. In some examples, aspects of the operations of 1305 may be performed by a slot determination component as described with reference to FIGS. 7 through 10.

At 1310, the UE may receive control signaling indicating a resource for measuring CLI. The operations of 1310 may be performed according to the methods described herein. In some examples, aspects of the operations of 1310 may be performed by a CLI control signaling receiver as described with reference to FIGS. 7 through 10.

At 1315, the UE may receive dynamic control signaling indicating that a symbol of a slot of the one or more slots is a flexible symbol. The operations of 1315 may be performed according to the methods described herein. In some examples, aspects of the operations of 1315 may be performed by a slot format control signaling receiver as described with reference to FIGS. 7 through 10.

At 1320, the UE may determine that the indicated resource overlaps with the flexible symbol. The operations of 1320 may be performed according to the methods described herein. In some examples, aspects of the operations of 1320 may be performed by a resource overlap determination component as described with reference to FIGS. 7 through 10.

At 1325, the UE may measure the CLI over the resource based on the dynamic control signaling indicating that the symbol is the flexible symbol and the flexible symbol overlapping with the resource. The operations of 1325 may be performed according to the methods described herein. In some examples, aspects of the operations of 1325 may be performed by a CLI measurement component as described with reference to FIGS. 7 through 10.

Figure 14:
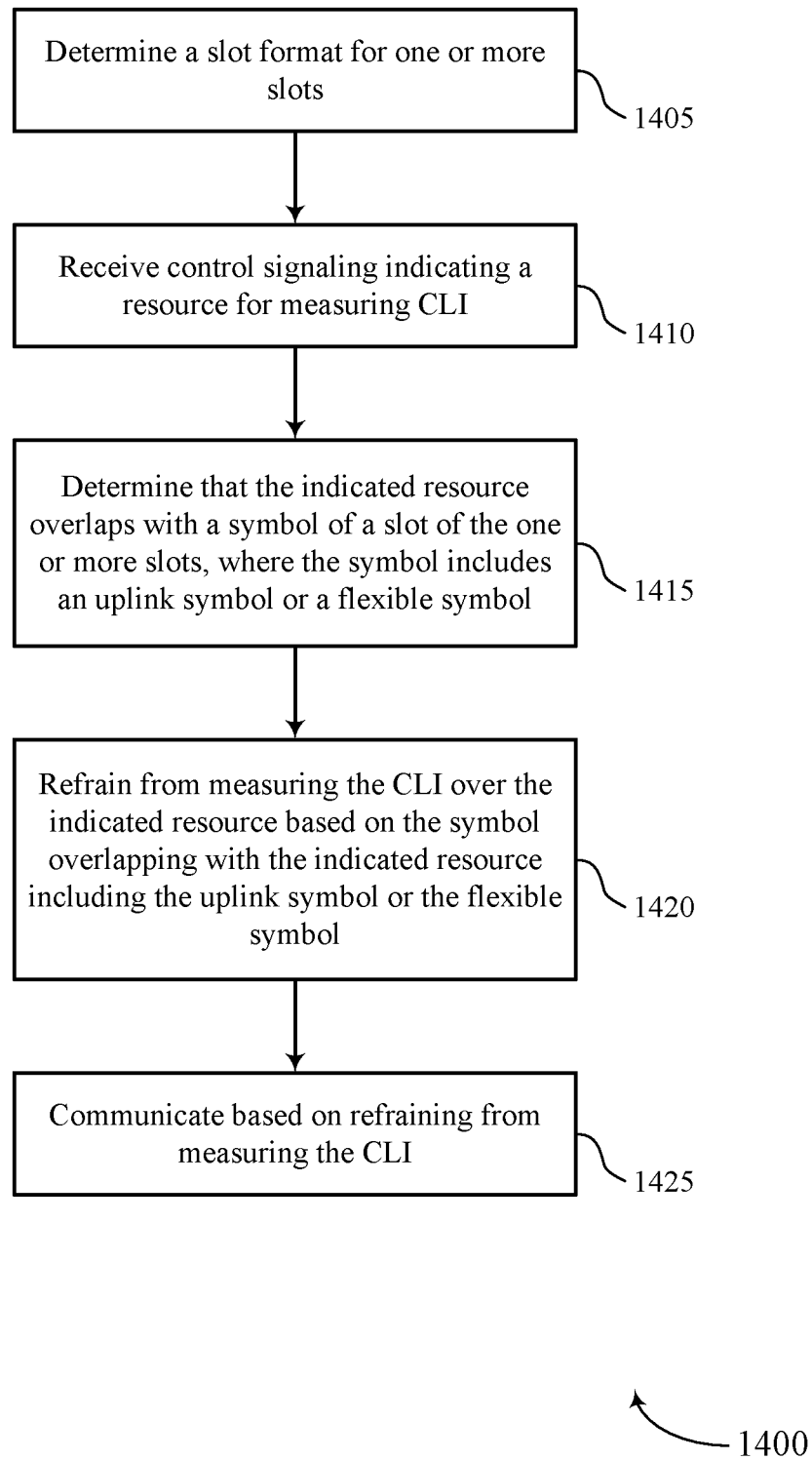

FIG. 14 shows a flowchart illustrating a method 1400 that supports slot formats for intra-frequency CLI measurement in accordance with aspects of the present disclosure. The operations of method 1400 may be implemented by a UE 115 or its components as described herein. For example, the operations of method 1400 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1405, the UE may determine a slot format for one or more slots. The operations of 1405 may be performed according to the methods described herein. In some examples, aspects of the operations of 1405 may be performed by a slot determination component as described with reference to FIGS. 7 through 10.

At 1410, the UE may receive control signaling indicating a resource for measuring CLI. The operations of 1410 may be performed according to the methods described herein. In some examples, aspects of the operations of 1410 may be performed by a CLI control signaling receiver as described with reference to FIGS. 7 through 10.

At 1415, the UE may determine that the indicated resource overlaps with a symbol of a slot of the one or more slots, where the symbol includes an uplink symbol or a flexible symbol. The operations of 1415 may be performed according to the methods described herein. In some examples, aspects of the operations of 1415 may be performed by a resource overlap determination component as described with reference to FIGS. 7 through 10.

At 1420, the UE may refrain from measuring the CLI over the indicated resource based on the symbol overlapping with the indicated resource. The operations of 1420 may be performed according to the methods described herein. In some examples, aspects of the operations of 1420 may be performed by a CLI measurement component as described with reference to FIGS. 7 through 10.

At 1425, the UE may communicate based on refraining from measuring the CLI. The operations of 1425 may be performed according to the methods described herein. In some examples, aspects of the operations of 1425 may be performed by a communication component as described with reference to FIGS. 7 through 10.

Figure 15:
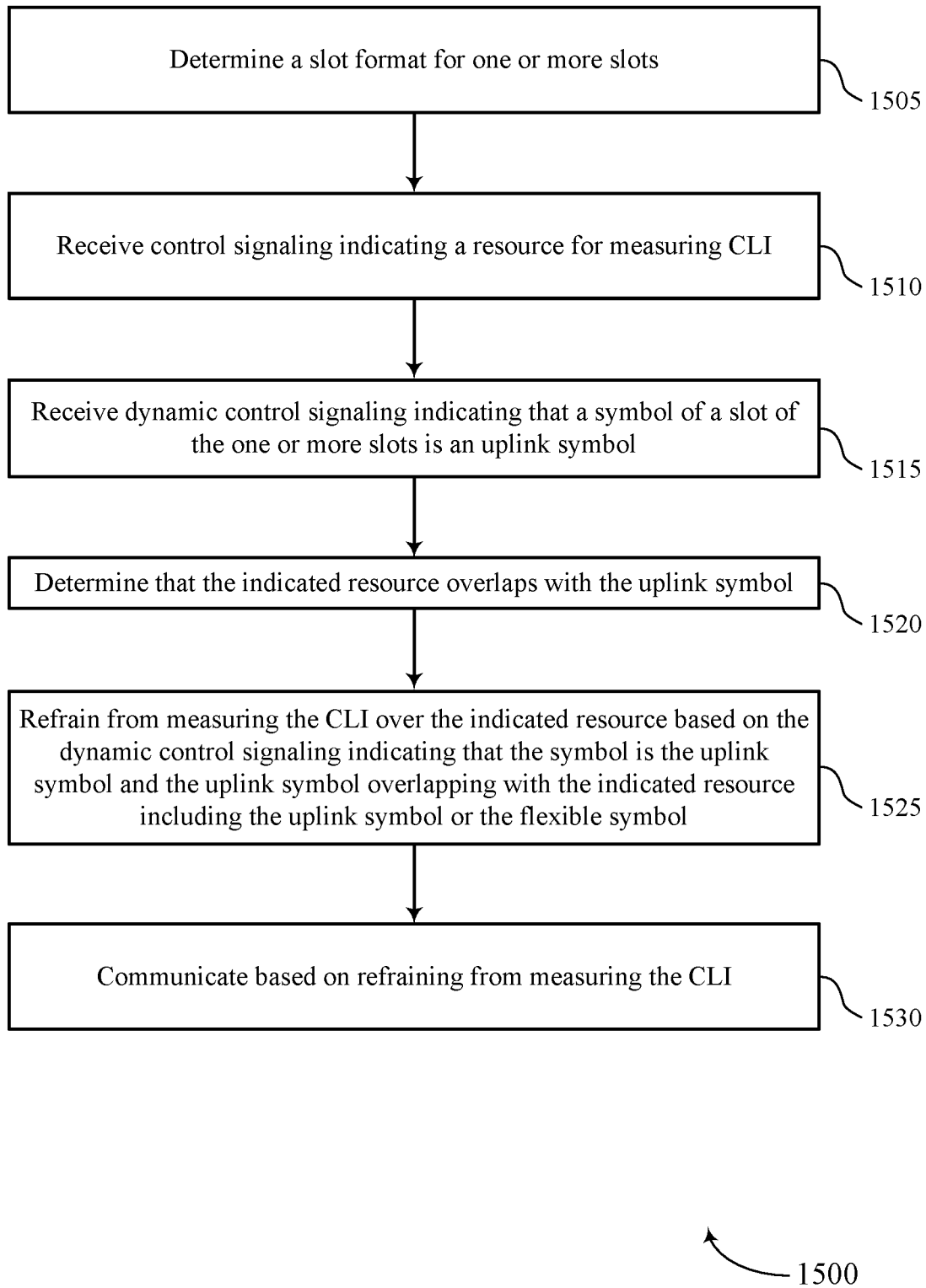

FIG. 15 shows a flowchart illustrating a method 1500 that supports slot formats for intra-frequency CLI measurement in accordance with aspects of the present disclosure. The operations of method 1500 may be implemented by a UE 115 or its components as described herein. For example, the operations of method 1500 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1505, the UE may determine a slot format for one or more slots. The operations of 1505 may be performed according to the methods described herein. In some examples, aspects of the operations of 1505 may be performed by a slot determination component as described with reference to FIGS. 7 through 10.

At 1510, the UE may receive control signaling indicating a resource for measuring CLI. The operations of 1510 may be performed according to the methods described herein. In some examples, aspects of the operations of 1510 may be performed by a CLI control signaling receiver as described with reference to FIGS. 7 through 10.

At 1515, the UE may receive dynamic control signaling indicating that a symbol of a slot of the one or more slots is an uplink symbol. The operations of 1515 may be performed according to the methods described herein. In some examples, aspects of the operations of 1515 may be performed by a slot format control signaling receiver as described with reference to FIGS. 7 through 10.

At 1520, the UE may determine that the indicated resource overlaps with the uplink symbol. The operations of 1520 may be performed according to the methods described herein. In some examples, aspects of the operations of 1520 may be performed by a resource overlap determination component as described with reference to FIGS. 7 through 10.

At 1525, the UE may refrain from measuring the CLI over the indicated resource based on the dynamic control signaling indicating that the symbol is the uplink symbol and the uplink symbol overlapping with the indicated resource including the uplink symbol or the flexible symbol. The operations of 1525 may be performed according to the methods described herein. In some examples, aspects of the operations of 1525 may be performed by a CLI measurement component as described with reference to FIGS. 7 through 10.

At 1530, the UE may communicate based on refraining from measuring the CLI. The operations of 1530 may be performed according to the methods described herein. In some examples, aspects of the operations of 1530 may be performed by a communication component as described with reference to FIGS. 7 through 10.

Figure 16:
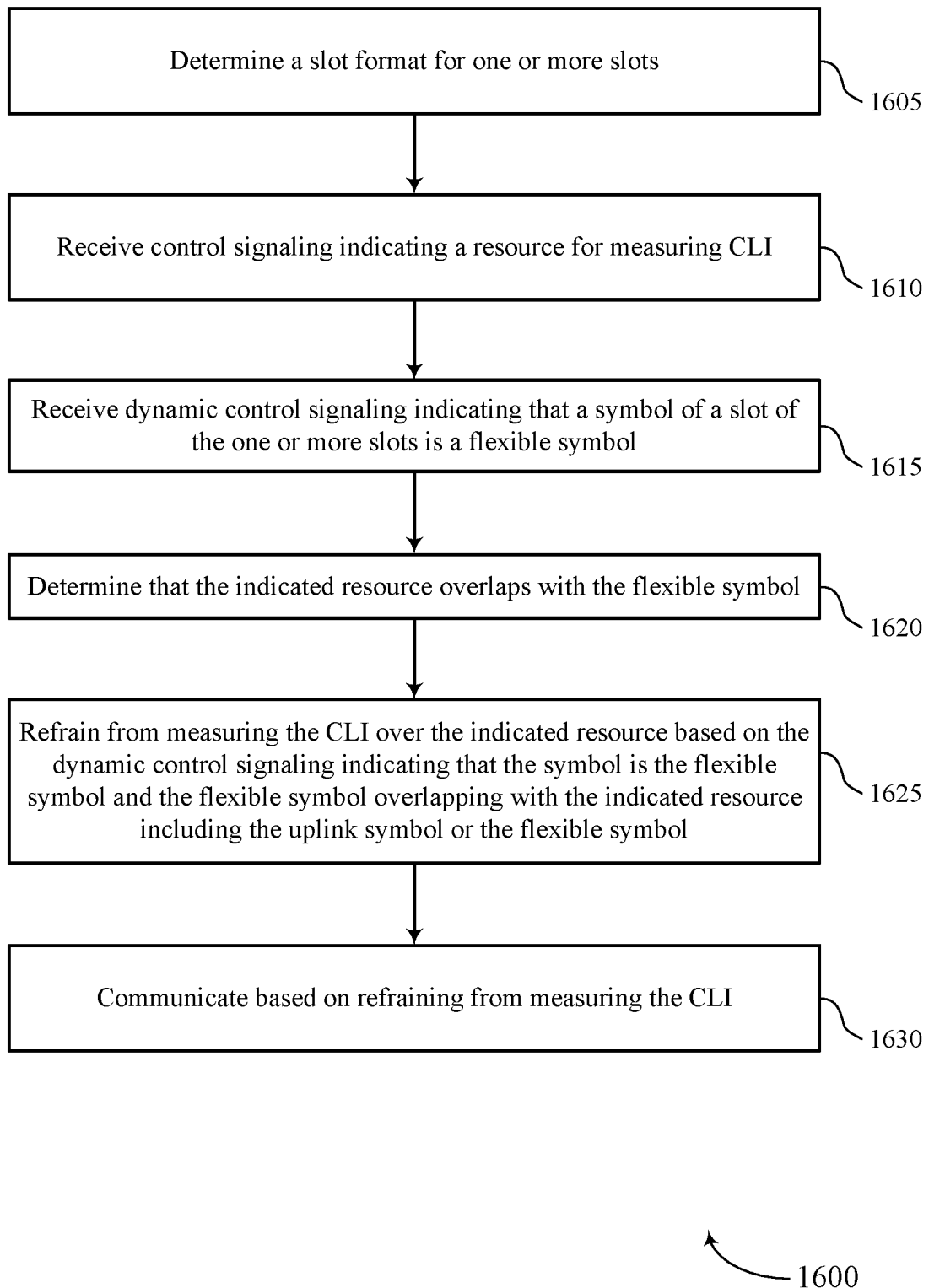

FIG. 16 shows a flowchart illustrating a method 1600 that supports slot formats for intra-frequency CLI measurement in accordance with aspects of the present disclosure. The operations of method 1600 may be implemented by a UE 115 or its components as described herein. For example, the operations of method 1600 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1605, the UE may determine a slot format for one or more slots. The operations of 1605 may be performed according to the methods described herein. In some examples, aspects of the operations of 1605 may be performed by a slot determination component as described with reference to FIGS. 7 through 10.

At 1610, the UE may receive control signaling indicating a resource for measuring CLI. The operations of 1610 may be performed according to the methods described herein. In some examples, aspects of the operations of 1610 may be performed by a CLI control signaling receiver as described with reference to FIGS. 7 through 10.

At 1615, the UE may receive dynamic control signaling indicating that a symbol of a slot of the one or more slots is a flexible symbol. The operations of 1615 may be performed according to the methods described herein. In some examples, aspects of the operations of 1615 may be performed by a slot format control signaling receiver as described with reference to FIGS. 7 through 10.

At 1620, the UE may determine that the indicated resource overlaps with the flexible symbol. The operations of 1620 may be performed according to the methods described herein. In some examples, aspects of the operations of 1620 may be performed by a resource overlap determination component as described with reference to FIGS. 7 through 10.

At 1625, the UE may refrain from measuring the CLI over the indicated resource based on the dynamic control signaling indicating that the symbol is the flexible symbol and the flexible symbol overlapping with the indicated resource including the uplink symbol or the flexible symbol. The operations of 1625 may be performed according to the methods described herein. In some examples, aspects of the operations of 1625 may be performed by a CLI measurement component as described with reference to FIGS. 7 through 10.

At 1630, the UE may communicate based on refraining from measuring the CLI. The operations of 1630 may be performed according to the methods described herein. In some examples, aspects of the operations of 1630 may be performed by a communication component as described with reference to FIGS. 7 through 10.

Figure 17:
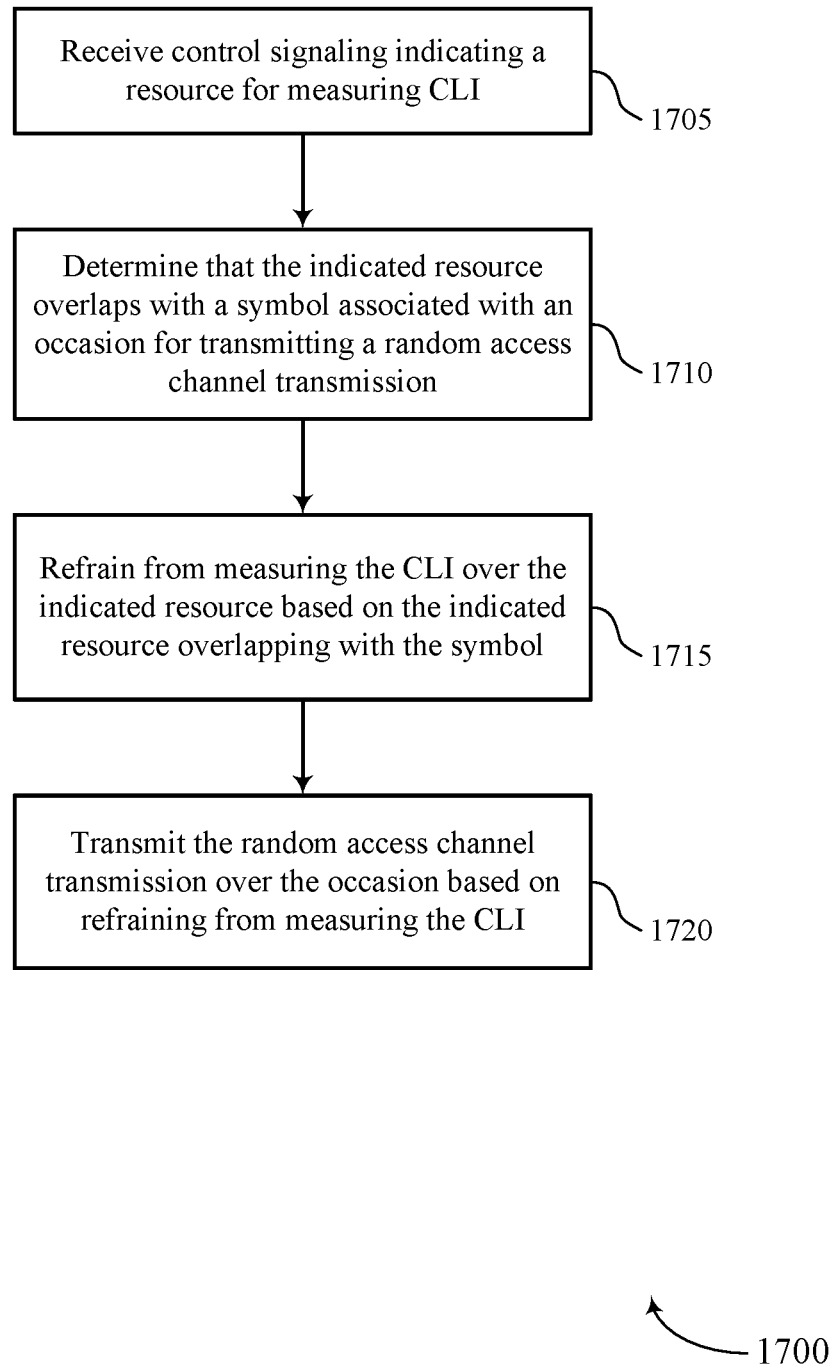

FIG. 17 shows a flowchart illustrating a method 1700 that supports slot formats for intra-frequency CLI measurement in accordance with aspects of the present disclosure. The operations of method 1700 may be implemented by a UE 115 or its components as described herein. For example, the operations of method 1700 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1705, the UE may receive control signaling indicating a resource for measuring CLI. The operations of 1705 may be performed according to the methods described herein. In some examples, aspects of the operations of 1705 may be performed by a CLI control signaling receiver as described with reference to FIGS. 7 through 10.

At 1710, the UE may determine that the indicated resource overlaps with a symbol associated with an occasion for transmitting a random access channel transmission. The operations of 1710 may be performed according to the methods described herein. In some examples, aspects of the operations of 1710 may be performed by a resource overlap determination component as described with reference to FIGS. 7 through 10.

At 1715, the UE may refrain from measuring the CLI over the indicated resource based on the indicated resource overlapping with the symbol. The operations of 1715 may be performed according to the methods described herein. In some examples, aspects of the operations of 1715 may be performed by a CLI measurement component as described with reference to FIGS. 7 through 10.

At 1720, the UE may transmit the random access channel transmission over the occasion based on refraining from measuring the CLI. The operations of 1720 may be performed according to the methods described herein. In some examples, aspects of the operations of 1720 may be performed by a random access channel transmitter as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying a slot format for one or more slots;
receiving control signaling indicating a resource for measuring cross link interference;
determining that the indicated resource overlaps with a symbol of a slot of the one or more slots, wherein the symbol comprises an upink symbol or a flexible symbol;
refraining from measuring the cross link interference over the indicated resource based at least in part on the symbol overlapping with the indicated resource comprising the uplink symbol or the flexible symbol; and
communicating based at least in part on refraining from measuring the cross link interference.

2. The method of claim 1, further comprising:
receiving dynamic control signaling indicating that the symbol comprises the downlink symbol, wherein refraining from measuring the cross link interference over the resource is based at least in part on the dynamic control signaling indicating that the symbol comprises the uplink symbol.

3. The method of claim 2, further comprising:
receiving semi-static control signaling indicating that the symbol comprises the flexible symbol; and
determining that the symbol comprises the downlink symbol based at least in part on the dynamic control signaling overriding the semi-static control signaling.

4. The method of claim 1, further comprising:
receiving dynamic control signaling indicating that the symbol comprises the flexible symbol, wherein measuring the cross link interference over the resource is based at least in part on the dynamic control signaling indicating that the symbol comprises the flexible symbol.

5. The method of claim 4, further comprising:
receiving semi-static control signaling indicating that the symbol comprises the flexible symbol, wherein measuring the cross link interference over the resource is based at least in part on the semi-static control signaling indicating that the symbol comprises the flexible symbol.

6. The method of claim 4, wherein the control signaling indicating the resource comprises semi-static control signaling indicating the resource, and wherein refraining from measuring the cross link interference over the resource that overlaps with the flexible symbol is based at least in part on the control signaling comprising the semi-static control signaling.

7. The method of claim 1, further comprising:
receiving semi-static control signaling indicating the slot format for the one or more slots, wherein refraining from measuring the cross link interference over the resource is based at least in part on the semi-static control signaling indicating the slot format for the one or more slots.

8. The method of claim 7, wherein the semi-static control signaling comprises a common slot format and a dedicated slot format, and wherein refraining from measuring the cross link interference over the resource is based at least in part on at least one of the common slot format or the dedicated slot format indicating that the symbol comprises the uplink symbol.

9. The method of claim 7, wherein the control signaling indicating the resource comprises second semi-static control signaling indicating the resource, and wherein refraining from measuring the cross link interference over the resource is based at least in part on the control signaling comprising the dynamic control signaling and based at least in part on the semi-static control signaling indicating that the symbol comprises the flexible symbol.

10. The method of claim 1, further comprising:
receiving dynamic control signaling indicating to transmit an uplink transmission over a second resource, wherein refraining from measuring the cross link interference over the resource is based at least in part on the second resource overlapping with at least one symbol of the slot of the one or more slots.

11. The method of claim 1, wherein the control signaling indicating the resource comprises semi-static control signaling indicating the resource, dynamic control signaling indicating the resource, radio resource control signaling indicating the resource, downlink control information indicating the resource, or any combination thereof.

12. The method of claim 11, wherein the symbol comprises the flexible symbol, and wherein refraining from measuring the cross link interference over the resource that overlaps with the flexible symbol is based at least in part on the symbol comprising the flexible symbol and based at least in part on the control signaling comprising the semi-static control signaling.

13. The method of claim 11, wherein the resource is periodic based at least in part on the control signaling comprising the semi-static control signaling, or wherein the resource is aperiodic or semi-persistently scheduled based at least in part on the control signaling comprising the dynamic control signaling.

14. A method for wireless communication, comprising:
receiving control signaling indicating a resource for measuring cross link interference;
determining that the indicated resource overlaps with a symbol associated with an occasion for transmitting a random access channel transmission;
refraining from measuring the cross link interference over the indicated resource based at least in part on the indicated resource overlapping with the symbol; and
transmitting the random access channel transmission over the occasion based at least in part on refraining from measuring the cross link interference.

15. The method of claim 14, wherein the symbol is within a threshold number of symbols prior to the occasion for transmitting the random access channel transmission.

16. The method of claim 14, wherein the control signaling comprises semi-static control signaling that indicates the resource, radio resource control signaling that indicates the resource, dynamic control signaling that indicates the resource, downlink control information that indicates the resource, or any combination thereof.

* * * * *